United States Patent
Kawanami et al.

(10) Patent No.: US 12,179,358 B2
(45) Date of Patent: Dec. 31, 2024

(54) ROBOT APPARATUS, METHOD FOR CONTROLLING ROBOT APPARATUS, AND LOAD COMPENSATION APPARATUS

(71) Applicant: SONY GROUP CORPORATION, Tokyo (JP)

(72) Inventors: Yasunori Kawanami, Tokyo (JP); Yasuhisa Kamikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 450 days.

(21) Appl. No.: 17/610,471

(22) PCT Filed: Feb. 25, 2020

(86) PCT No.: PCT/JP2020/007537
§ 371 (c)(1),
(2) Date: Nov. 11, 2021

(87) PCT Pub. No.: WO2020/240950
PCT Pub. Date: Dec. 3, 2020

(65) Prior Publication Data
US 2022/0219321 A1    Jul. 14, 2022

(30) Foreign Application Priority Data

May 27, 2019   (JP) ................. 2019-098383

(51) Int. Cl.
*B25J 9/16* (2006.01)
*B25J 11/00* (2006.01)
*B62D 57/032* (2006.01)

(52) U.S. Cl.
CPC .......... *B25J 9/1638* (2013.01); *B25J 9/1633* (2013.01); *B25J 9/1641* (2013.01); *B25J 11/008* (2013.01); *B62D 57/032* (2013.01)

(58) Field of Classification Search
CPC ...... B25J 9/1638; B25J 9/1633; B25J 9/1641; B25J 11/008; B25J 19/0016; B62D 57/032
See application file for complete search history.

(56) References Cited

U.S. PATENT DOCUMENTS

| 2011/0126660 A1* | 6/2011 | Lauzier ............... B25J 17/0208 901/46 |
| 2011/0190934 A1 | 8/2011 | Reiland et al. |

(Continued)

FOREIGN PATENT DOCUMENTS

| CN | 102961202 A | 3/2013 |
| CN | 103144693 A | 6/2013 |

(Continued)

OTHER PUBLICATIONS

English translation of Japanese patent publication Jp 2018140475A, Espace (Year: 2018).*

(Continued)

*Primary Examiner* — Abby Y Lin
*Assistant Examiner* — Danielle M Jackson
(74) *Attorney, Agent, or Firm* — CHIP LAW GROUP

(57) ABSTRACT

Provided is a robot apparatus that includes a load compensation function dealing with a variation in load, where the robot apparatus includes one or more movable portions, a load compensation section utilizing an elastic body to compensate for a load acting on the movable portion, and an initial displacement amount setting section applying, to the elastic body, an initial displacement amount corresponding to a desired position or posture of the movable portion. The initial displacement setting section includes an actuator displacing the elastic body by an initial displacement amount and locks the actuator with the elastic body remaining displaced by the initial displacement amount. The movable portion is a leg including a joint portion having a degree (Continued)

of rotational freedom around a pitch axis, and the initial displacement amount setting section sets the initial displacement amount on the basis of a toe force of the leg.

16 Claims, 15 Drawing Sheets

(56) References Cited

U.S. PATENT DOCUMENTS

| | | | | |
|---|---|---|---|---|
| 2013/0310979 | A1* | 11/2013 | Herr | B62D 57/032 |
| | | | | 700/258 |
| 2018/0133905 | A1* | 5/2018 | Smith | F16D 25/14 |
| 2022/0144358 | A1* | 5/2022 | Hurst | F16F 3/12 |
| 2022/0228710 | A1* | 7/2022 | Asbeck | F16M 13/04 |

FOREIGN PATENT DOCUMENTS

| | | |
|---|---|---|
| CN | 104149871 A | 11/2014 |
| CN | 204674327 U | 9/2015 |
| CN | 108357583 A | 8/2018 |
| CN | 109760761 A | 5/2019 |
| DE | 102011009669 A | 12/2011 |
| JP | 8-259199 A | 10/1996 |
| JP | 2003-181789 A | 7/2003 |
| JP | 2007-119249 A | 5/2007 |
| JP | 2007-125638 A | 5/2007 |
| JP | 2009-154256 A | 7/2009 |
| JP | 2014-140300 A | 7/2014 |
| JP | 2015-229539 A | 12/2015 |
| JP | 2018-140475 A | 9/2018 |
| JP | 2018172193 A | 11/2018 |

OTHER PUBLICATIONS

International Search Report and Written Opinion of PCT Application No. PCT/JP2020/007537, issued on May 26, 2020, 11 pages of ISRWO.

* cited by examiner

ROBOT APPARATUS, METHOD FOR CONTROLLING ROBOT APPARATUS, AND LOAD COMPENSATION APPARATUS

CROSS REFERENCE TO RELATED APPLICATIONS

This application is a U.S. National Phase of International Patent Application No. PCT/JP2020/007537 filed on Feb. 25, 2020, which claims priority benefit of Japanese Patent Application No. JP 2019-098383 filed in the Japan Patent Office on May 27, 2019. Each of the above-referenced applications is hereby incorporated herein by reference in its entirety.

TECHNICAL FIELD

A technique disclosed herein relates to a robot apparatus including a movable portion such as a leg or an arm, a method for controlling the robot apparatus, and a load compensation apparatus.

BACKGROUND ART

In connection with the recent spread of automation techniques, robot apparatuses that include a movable portion such as a leg or an arm and that can be automatically operated have been utilized. The movable portion typically includes a multilink structure including a plurality of links connected together by a joint, and the movable portion is moved to any posture by driving the joint with use of an actuator such as a motor.

Additionally, a load due to weights of the links constantly acts on the movable portion of the robot apparatus, and thus even in a case where the movable portion is to be kept stationary in a particular posture such as an upright posture, the actuator for driving the joint needs to be continuously operated, leading to power consumption. Thus, a robot apparatus with a deadweight compensation function has been developed, the apparatus including an elastic body such as a spring assembled with the joint to reduce the load due to a weight of the robot apparatus during the stationary state.

For example, there has been proposed a deadweight compensation apparatus that is applied to a link mechanism such as an arm to change a spring constant according to a load (see PTL 1) Additionally, there has been proposed a load compensation apparatus that extends or contracts a string according to a weight of an object placed on a platform to change elasticity for compensation (see PTL 2).

CITATION LIST

Patent Literature

[PTL 1]
 JP 2018-140475A
[PTL 2]
 JP 2015-229539A
[PTL 3]
 JP 2014-140300A

SUMMARY

Technical Problem

An object of a technique disclosed herein is to provide a robot apparatus including a load compensation function for a movable portion, a method for controlling the robot apparatus, and the load compensation apparatus.

Solution to Problem

A technique disclosed herein is developed in view of the above-described object, and a first aspect of the technique is a robot apparatus including one or more movable portions, a load compensation section utilizing an elastic body to compensate for a load acting on the movable portion, and an initial displacement amount setting section applying, to the elastic body, an initial displacement amount corresponding to a desired position or posture of the movable portion.

The initial displacement setting section includes an actuator displacing the elastic body by an initial displacement amount and locks the actuator with the elastic body remaining displaced by the initial displacement amount.

Additionally, the movable portion is a leg including a joint portion having at least a degree of rotational freedom around a pitch axis. Further, the initial displacement amount setting section calculates an initial displacement amount to be applied to the elastic body on the basis of a toe force of the leg calculated from a weight of luggage placed on the robot apparatus and a weight of the robot apparatus main body and a position of a center of gravity.

A second aspect of the technique described herein is a method for controlling a robot apparatus including one or more movable legs and utilizing an elastic body to compensate for a load acting on the movable leg. The method includes the steps of calculating an initial displacement amount to be applied to the elastic body on the basis of a toe force of the leg calculated from a weight of luggage placed on the robot apparatus and a weight of the robot apparatus main body and a position of a center of gravity, and using an actuator to displace the elastic body by the initial displacement amount and locking the actuator with the elastic body remaining displaced by the initial displacement amount.

A third aspect of the technique disclosed herein is a load compensation apparatus for a robot apparatus including one or more movable portions. The load compensation apparatus includes an elastic body compensating, by a restoring force, for a load acting on the movable portion, and an initial displacement amount setting section applying, to the elastic body, an initial displacement amount corresponding to a desired position or posture of the movable portion.

Advantageous Effect of Invention

The technique disclosed herein can provide a robot apparatus including a load compensation function dealing with a variation in load, a method for controlling the robot apparatus, and a load compensation apparatus.

Effects described herein are only illustrative, and effects produced by the technique disclosed herein are not limited to the effect described herein. Additionally, in addition to the above-described effect, the technique disclosed herein may further produce additional effects.

Further other objects, features, and advantages of the technique disclosed herein will be clarified by more detailed description based on an embodiment described below and accompanying drawings.

DESCRIPTION OF EMBODIMENT

An embodiment of a technique disclosed herein will be described below in detail with reference to the drawings.

A. Apparatus Configuration

Figure 1:
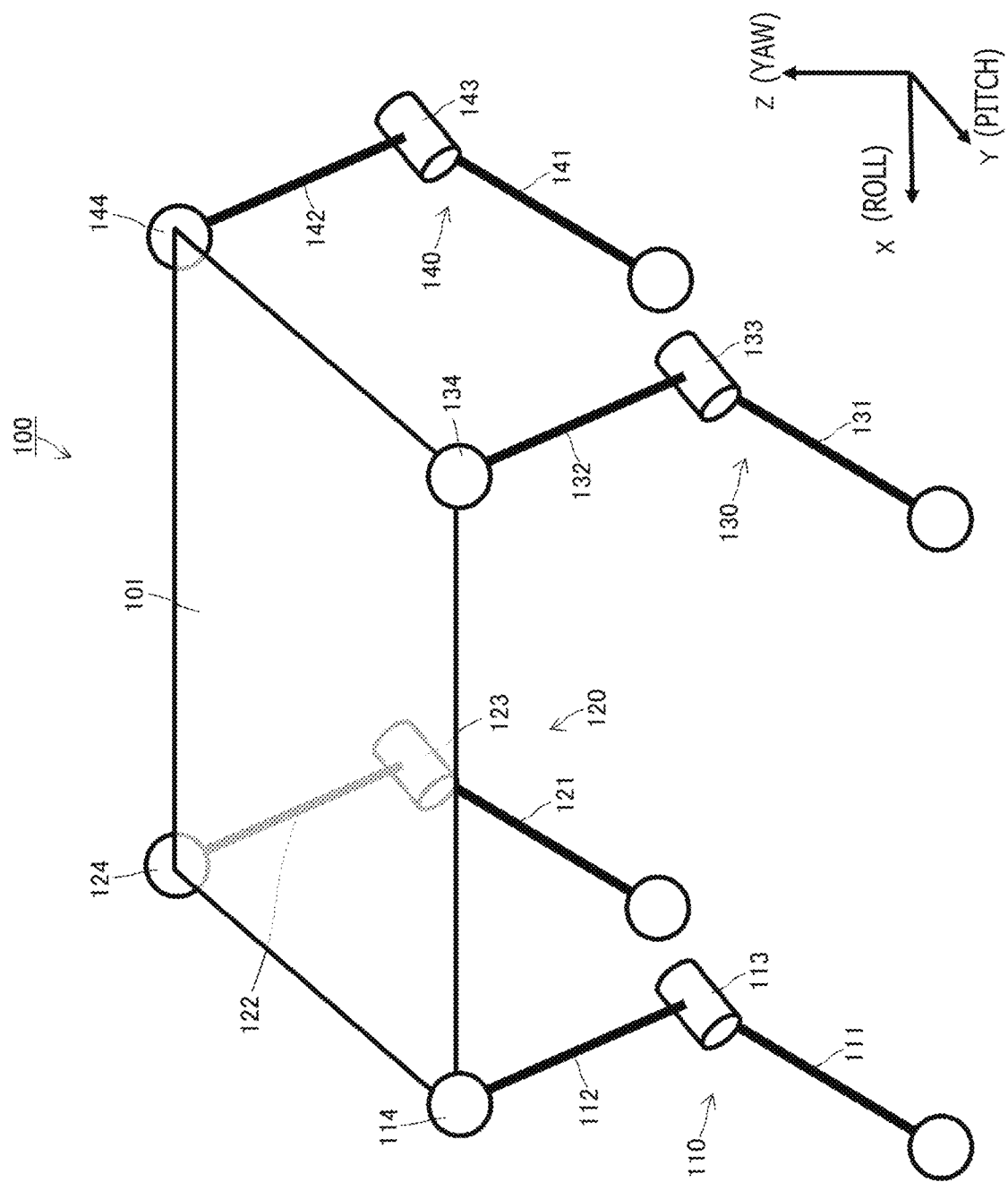
FIG. 1 is a diagram illustrating a configuration example of a degree of freedom of a robot apparatus 100 including a movable portion.

FIG. 1 schematically illustrates a configuration example of the degree of freedom of a robot apparatus 100 including a movable portion. The illustrated robot apparatus 100 includes a loading portion 101 on which luggage can be loaded, and four movable legs 110, 120, 130, and 140 coupled to respective four corners of the loading portion 101. The robot apparatus 100 is a walking robot that walks by synchronously operating the movable legs 110, 120, 130, and 140. Additionally, the robot apparatus 100 is assumed to be a luggage carriage robot carrying the luggage placed on the loading portion 101.

The movable leg 110 includes two links 111 and 112 and a joint portion 113 connecting the link 111 and the link 112. The other end (lower end) of the link 111 corresponds to a sole and is installed on a floor surface. Additionally, an upper end of the link 112 is attached to the loading portion 101 via a joint portion 114. The joint portion 113 has a degree of rotational freedom around a pitch axis and can be caused by an actuator such as a pitch axis rotation motor (not illustrated) to drive the link 111 around the pitch axis with respect to the link 112. Additionally, the joint portion 114 has at least a degree of rotational freedom around the pitch axis and can be caused by an actuator such as a pitch axis rotation motor (not illustrated) to drive the link 112 around the pitch axis with respect to the loading portion 101.

Additionally, the movable leg 120 includes two links 121 and 122 and a joint portion 123 connecting the link 121 and the link 122. The other end (lower end) of the link 121 corresponds to a sole and is installed on the floor surface. Additionally, an upper end of the link 122 is attached to the loading portion 101 via a joint portion 124. The joint portion 123 has a degree of rotational freedom around the pitch axis and can be caused by an actuator such as a pitch axis rotation motor (not illustrated) to drive the link 121 around the pitch axis with respect to the link 122. Additionally, the joint portion 124 has at least a degree of rotational freedom around the pitch axis and can be caused by an actuator such as a pitch axis rotation motor (not illustrated) to drive the link 122 around the pitch axis with respect to the loading portion 101.

Additionally, the movable leg 130 includes two links 131 and 132 and a joint portion 133 connecting the link 131 and the link 132. The other end (lower end) of the link 131 corresponds to a sole and is installed on the floor surface. Additionally, an upper end of the link 132 is attached to the loading portion 101 via a joint portion 134. The joint portion 133 has a degree of rotational freedom around the pitch axis and can be caused by an actuator such as a pitch axis rotation motor (not illustrated) to drive the link 131 around the pitch axis with respect to the link 132. Additionally, the joint portion 134 has at least a degree of rotational freedom around the pitch axis and can be caused by an actuator such as a pitch axis rotation motor (not illustrated) to drive the link 132 around the pitch axis with respect to the loading portion 101.

Additionally, the movable leg 140 includes two links 141 and 142 and a joint portion 143 connecting the link 141 and the link 142. The other end (lower end) of the link 141 corresponds to a sole and is installed on the floor surface. Additionally, an upper end of the link 142 is attached to the loading portion 101 via a joint portion 144. The joint portion 143 has a degree of rotational freedom around the pitch axis and can be caused by an actuator such as a pitch axis rotation motor (not illustrated) to drive the link 141 around the pitch axis with respect to the link 142. Additionally, the joint portion 144 has at least a degree of rotational freedom around the pitch axis and can be caused by an actuator such as a pitch axis rotation motor (not illustrated) to drive the link 142 around the pitch axis with respect to the loading portion 101.

Luggage (not illustrated) with a weight equal to or smaller than a rated weight can be placed on the loading portion 101. Additionally, the robot apparatus 100 can move on foot by synchronously driving the four movable legs 110, 120, 130, and 140, thus allowing carriage of the luggage placed on the loading portion 101. Additionally, the placement surface of the loading portion 101 is desirably kept substantially level to prevent the luggage from slipping down from the loading portion 101 during conveyance.

Note that a "reference posture" of the robot apparatus 100 illustrated in FIG. 1 refers to a position and a posture often used for walking. More specifically, the "reference posture" of the robot apparatus 100 refers to the position and the posture in which the placement surface of the loading portion 101 is kept substantially level to prevent the luggage from slipping down from the loading portion 101.

Figure 2:
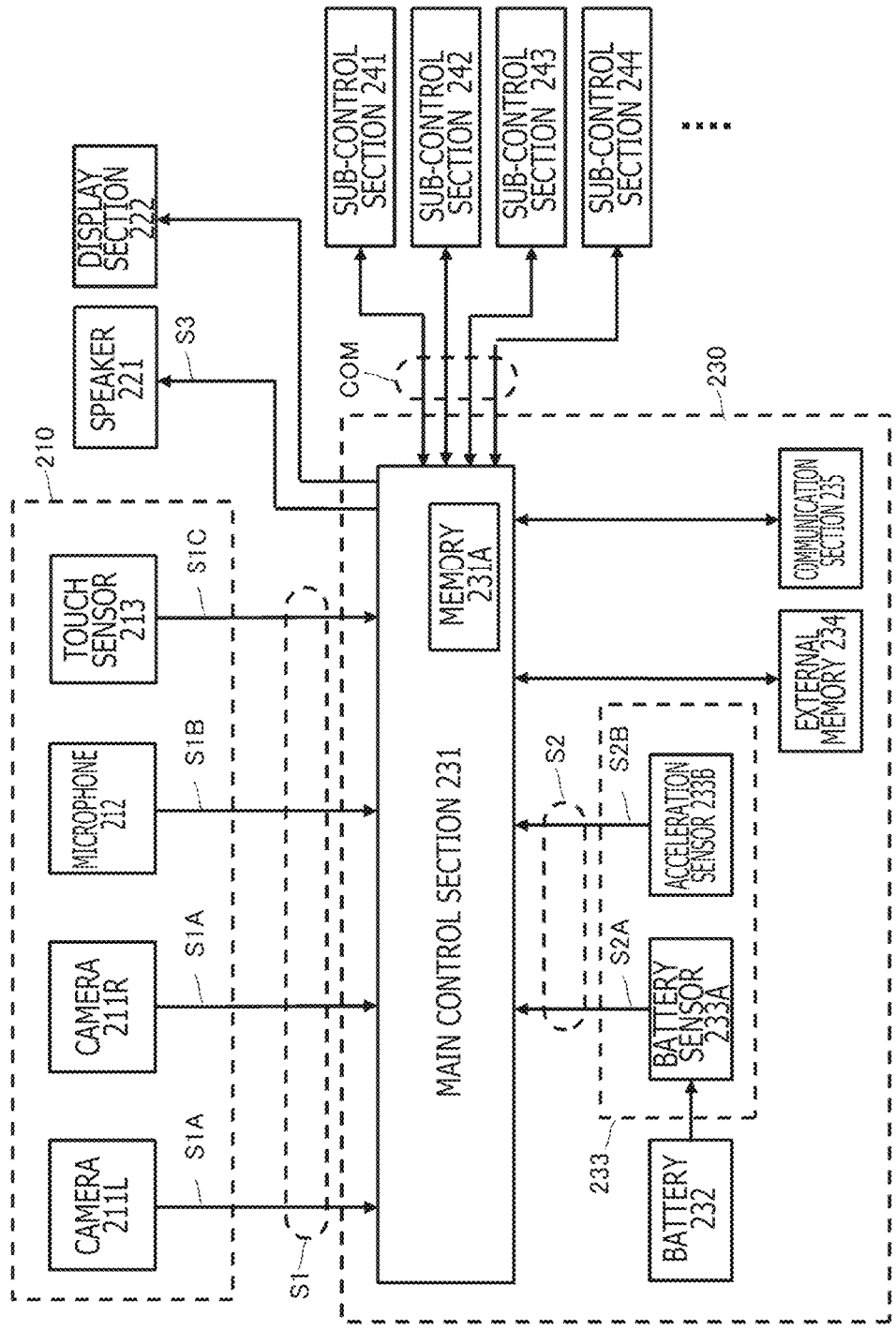
FIG. 2 is a diagram illustrating a configuration example of an electric system of the robot apparatus 100.

FIG. 2 illustrates a configuration example of an electric system of the robot apparatus 100.

The robot apparatus 100 includes, as an external sensor section 210, cameras 211L and 211R functioning as a left and a right "eyes" of the robot apparatus 100, a microphone 212 functioning as an "ear," a touch sensor 213, and the like. The cameras 211L and 211R, the microphone 212, the touch sensor 213, and the like are disposed at predetermined positions. As the cameras 211L and 211R, for example, cameras that include an imaging element such as a CMOS (Complementary Metal Oxide Semiconductor) or a CCD (Charge Couple Device) are used.

Note that, although not illustrated, the external sensor section 210 may further include another sensor. For example, the external sensor section 210 includes sole sensors that measure a floor reaction force acting on the sole of each of the movable legs 110, 120, 130, and 140, or the like. Each of the sole sensors includes, for example, a 6DOF (Degree Of Freedom) force sensor or the like.

Additionally, the external sensor section 210 may also include a LIDAR (Laser Imaging Detection and Ranging) sensor, a TOF (Time Of Flight) sensor, or a laser range sensor that can measure or estimate the direction of a predetermined target and the distance to the predetermined target. Additionally, the external sensor section 210 may include a GPS (Global Positioning System) sensor, an infrared sensor, a temperature sensor, a humidity sensor, an illuminance sensor, or the like.

Additionally, the robot apparatus 100 includes, as an output section, a speaker 221, a display section 222, and the like disposed at predetermined positions. The speaker 221 functions to output voice and provides, for example, voice guidance. Additionally, the display section 222 displays the state of the robot apparatus 100 and a response to a user.

A main control section 231, a battery 232, an internal sensor section 233, an external memory 234, and a communication section 235 are disposed in a control unit 230. The internal sensor section 233 includes a battery sensor 233A and an acceleration sensor 233B.

The cameras 211L and 211R of the external sensor section 210 image a surrounding situation and transmit an image signal S1A obtained to the main control section 231. The microphone 212 collects voice input from the user and transmits a voice signal S1B obtained to the main control section 231. The input voice provided to the robot apparatus 100 by the user include an activation word, various instruction voices (voice commands) such as "walk," "turn to the right," "hurry," and "stop,". Note that FIG. 2 illustrates only one microphone 82 but that two or more microphones may be provided for the left and right ears, for example, to estimate the direction of a voice source.

Additionally, the touch sensor 213 of the external sensor section 210 is, for example, laid on the placement surface of the loading portion 101 and detects a pressure received in a place where the luggage is placed on the loading portion 101. The touch sensor 213 transmits a detection result to the main control section 231 as a pressure detection signal S1C.

The battery sensor 233A of the internal sensor section 233 detects the amount of energy remaining in the battery 232 every predetermined periods and transmits a detection result to the main control section 231 as a battery remaining amount detection signal S2A.

The acceleration sensor 233B detects, for movement of the robot apparatus 100, accelerations in the directions of three axes (an x (roll) axis, a y (pitch) axis, and a z (yaw) axis) every predetermined periods and transmits a detection result to the main control section 231 as an acceleration detection signal S2B. For example, the acceleration sensor 233B may be an IMU (Inertia Measurement Unit) equipped with a three-axis gyroscope, an acceleration sensor for three directions, and the like. The IMU can be used to measure the angle and the acceleration of the robot apparatus 100 main body or the loading portion 101.

The external memory 234 stores programs, data, control parameters, and the like and provides any of the programs and data to a memory 231A built in the main control section 231 as needed. Additionally, the external memory 234 receives the data or the like from the memory 231A and stores it. Note that the external memory 234 may be configured as, for example, a cartridge type memory card such as an SD card and may be attachable to and removable from the robot apparatus 100 main body (or the control unit 230).

The communication section 235 performs data communication with the outside on the basis of, for example, a communication scheme such as Wi-Fi (registered trademark) or LTE (Long Term Evolution). For example, a program such as an application executed by the main control section 231 or data needed to execute the program can be acquired from the outside via the communication section 235.

The main control section 231 incorporates the memory 231A. The memory 231A stores programs and data, and the main control section 231 executes any of the programs stored in the memory 231A to perform various steps of processing. In other words, the main control section 231 determines the surrounding or internal situation of the robot apparatus 100, the presence or absence of an instruction from the user or approach from the user, or the like on the basis of the image signal S1A, the voice signal S1B, and the pressure detection signal S1C (hereinafter collectively referred to as an external sensor signal S1) respectively provided by the cameras 211L and 211R, the microphone 212, and the touch sensor 213 of the external sensor section 210 and on the basis of the battery remaining amount detection signal S2A and the acceleration detection signal S2B (hereinafter collectively referred to as an internal sensor signal S2) respectively provided by the battery sensor 233A, the acceleration sensor 233B, and the like of the internal sensor section 233. Note that the memory 231A may store, in advance, the weight of the robot apparatus 100 main body and the position of the center of gravity of the robot apparatus 100 main body (in this case, no luggage is placed on the loading portion 101).

Then, on the basis of a determination result for the surrounding or internal situation of the robot apparatus 100 or the presence or absence of an instruction from the user or approach from the user, on the basis of the control programs stored in the internal memory 231A in advance, or on the basis of various control parameters stored in the external memory 234 installed at that time, the main control section 231 determines action of the robot apparatus 100 and an exhibited operation to be performed for the user, generates a control command based on a determination result, and transmits the control command to sub-control sections 241, 242, . . . .

The sub-control sections 241, 242, . . . are responsible for controlling operations of subsystems in the robot apparatus 100 and drives the subsystems on the basis of the control command provided by the main control section 231. The above-described movable legs 110, 120, 130, and 140 correspond to the subsystems and are driven and controlled by the sub-control sections 241, 242, 243, and 244, respectively. Specifically, the sub-control sections 241, 242, 243, and 244 drive and control the joint portions 113, 123, 133, and 143 and perform control such as setting of an initial displacement amount for each of load compensation mechanisms (described below).

B. Load Compensation

Figure 3:
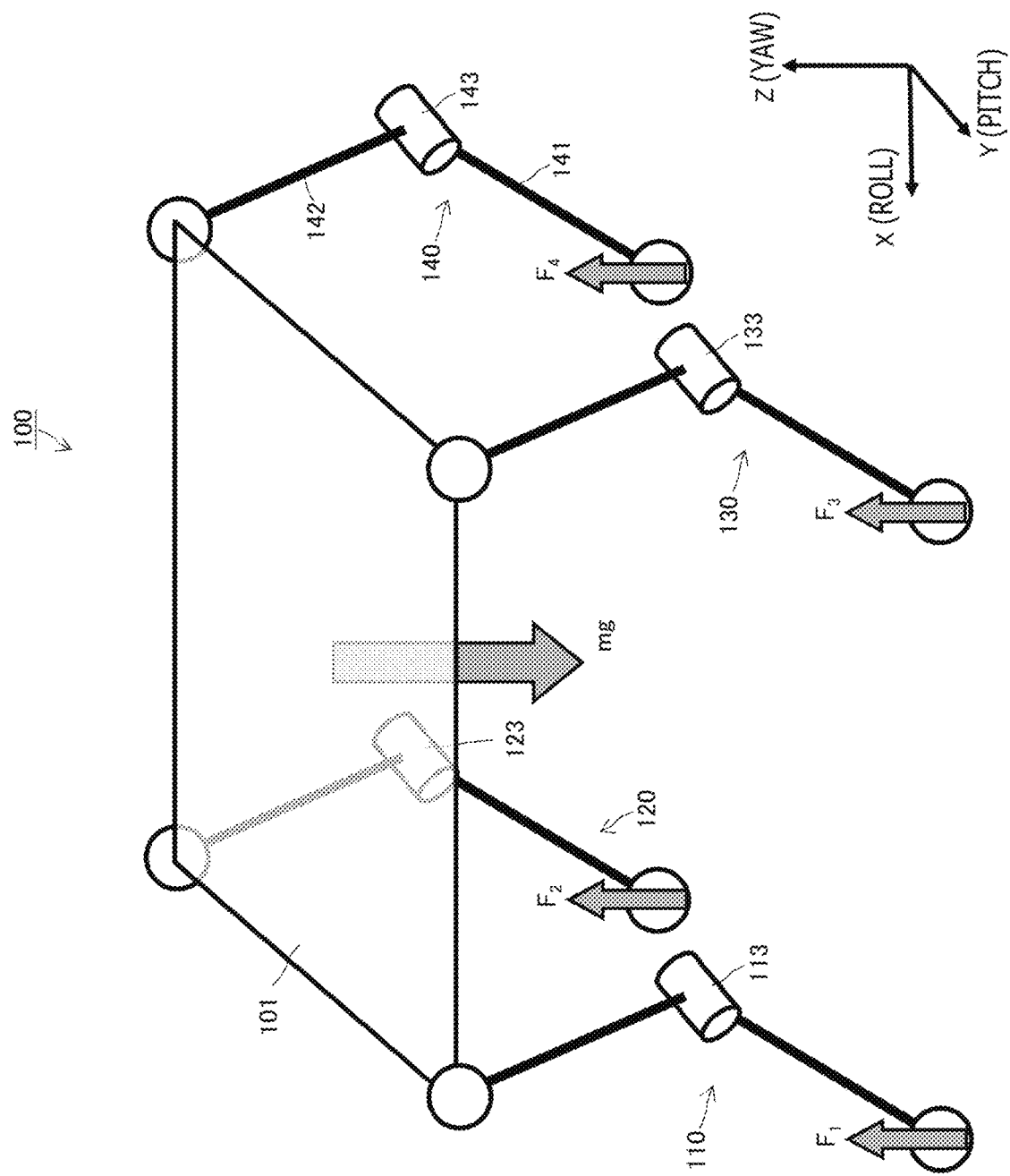
FIG. 3 is a diagram illustrating a weight of the robot apparatus 100 acting on the robot apparatus 100.

FIG. 3 schematically illustrates the weight of the robot apparatus 100 acting on the robot apparatus 100. Strictly speaking, the weight of the robot apparatus 100 includes the weights of the movable legs 110, 120, 130, and 140, but for simplification of description, FIG. 3 illustrates a weight mg of the robot apparatus 100 with a mass m acting on the loading portion 101.

The weight mg acts distributively on the movable legs 110, 120, 130, and 140. Then, floor reaction forces $F_1$, $F_2$, $F_3$, and $F_4$ act on the soles of the movable legs 110, 120, 130, and 140, respectively. In a case where the weight mg acts evenly distributively on the movable legs 110, 120, 130, and 140, then $F_1=F_2=F_3=F_4$ (=F).

In short, the weight mg constantly acts on each of the movable legs 110, 120, 130, and 140. Thus, to make the robot apparatus 100 stationary in a posture as illustrated in FIG. 3 (for example, the "reference posture" in which a height H from the floor surface to the loading portion 101 is constant and in which the placement surface of the loading portion 101 lies level), the actuators for pitch axis driving for the joint portions 113, 123, 133, and 143 need to be operated, leading to continued power consumption even in the stationary state.

Figure 4:
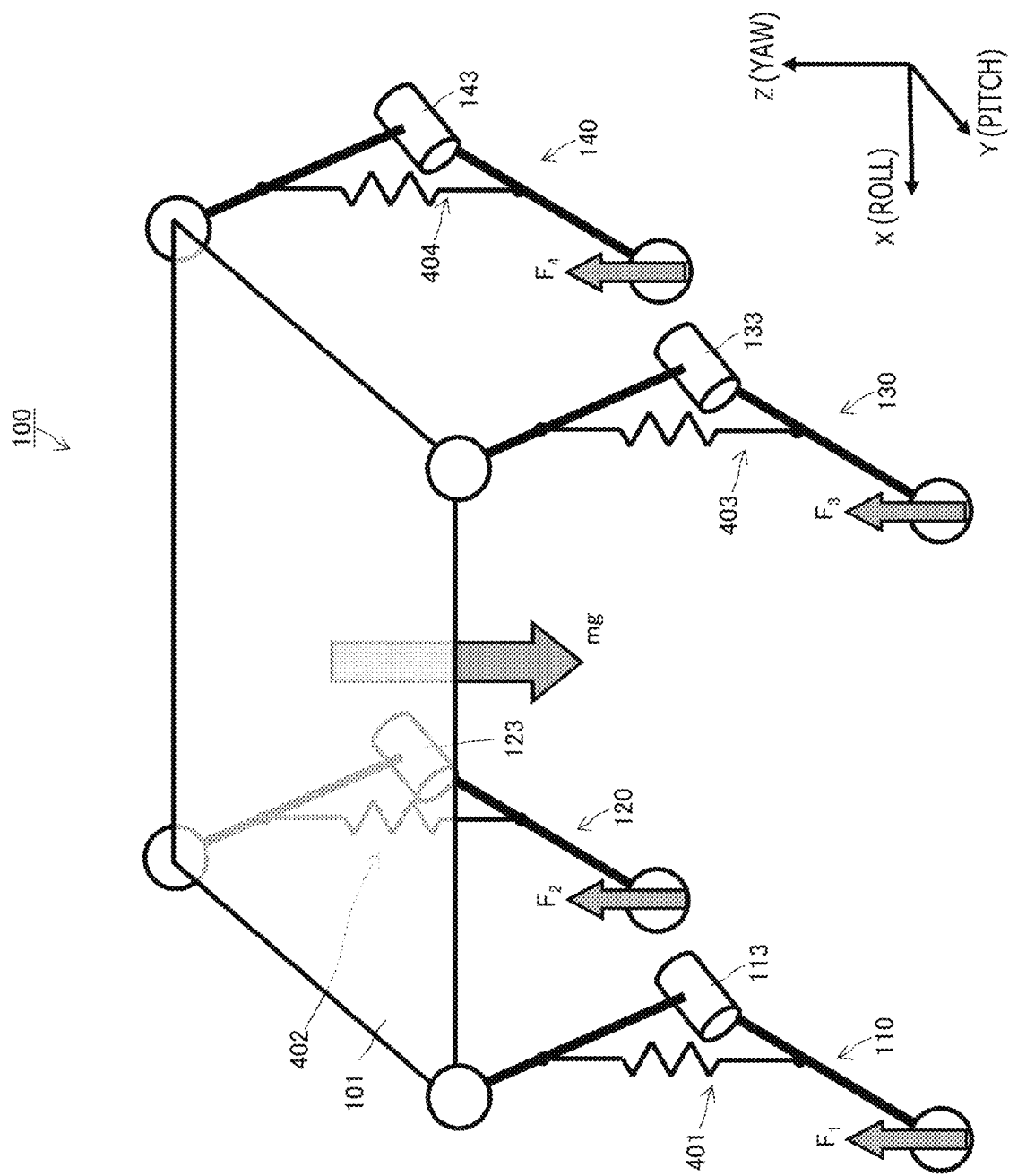
FIG. 4 is a diagram illustrating movable legs of the robot apparatus 100, the movable legs being assembled with springs for deadweight compensation.

FIG. 4 illustrates the movable legs 110, 120, 130, and 140 being assembled with springs 401, 402, 403, and 404 for deadweight compensation. When link structures of the movable legs 110, 120, 130, and 140 act to close due to the weight of the robot apparatus 100, the springs 401, 402, 403, and 404 contract to generate restoring forces. Consequently, by using the restoring forces of the springs 401, 402, 403, and 404 to reduce loads imposed on the joint portions 113, 123, 133, and 143 due to the weight of the robot apparatus 100, power consumption for operating the actuators for pitch axis driving for the joint portions 113, 123, 133, and 143 can be decreased.

Note that, as the springs used for load compensation such as deadweight compensation, tension springs applying twisting moment around the pitch axes of the joint portions 113, 123, 133, and 143 may be utilized besides coil springs as illustrated in FIG. 4 (compression coil springs or tension coil springs).

The weight mg is assumed to be evenly distributed over the movable legs 110, 120, 130, and 140, leading to action of the same floor reaction force F. Additionally, all of the springs 401, 402, 403, and 404 are assumed to each have a spring constant K. In this case, if the movable legs 110, 120, 130, and 140 are assembled with the springs 401, 402, 403, and 404 with an initial displacement amount $\Delta x$ applied to the springs 401, 402, 403, and 404 such that a restoring force $K \cdot \Delta x$ that counters the floor reaction force F (=mg/4) acts on each of the springs 401, 402, 403, and 404, the loads imposed on the joint portions 113, 123, 133, and 143 can be reduced to make the robot apparatus 100 stationary in the "reference posture" in which the height H from the floor surface to the loading portion 101 is constant and in which the placement surface of the loading portion 101 lies level. At this time, it is substantially unnecessary to operate the actuators for driving the pitch axes of the joint portions 113, 123, 133, and 143.

Figure 5:
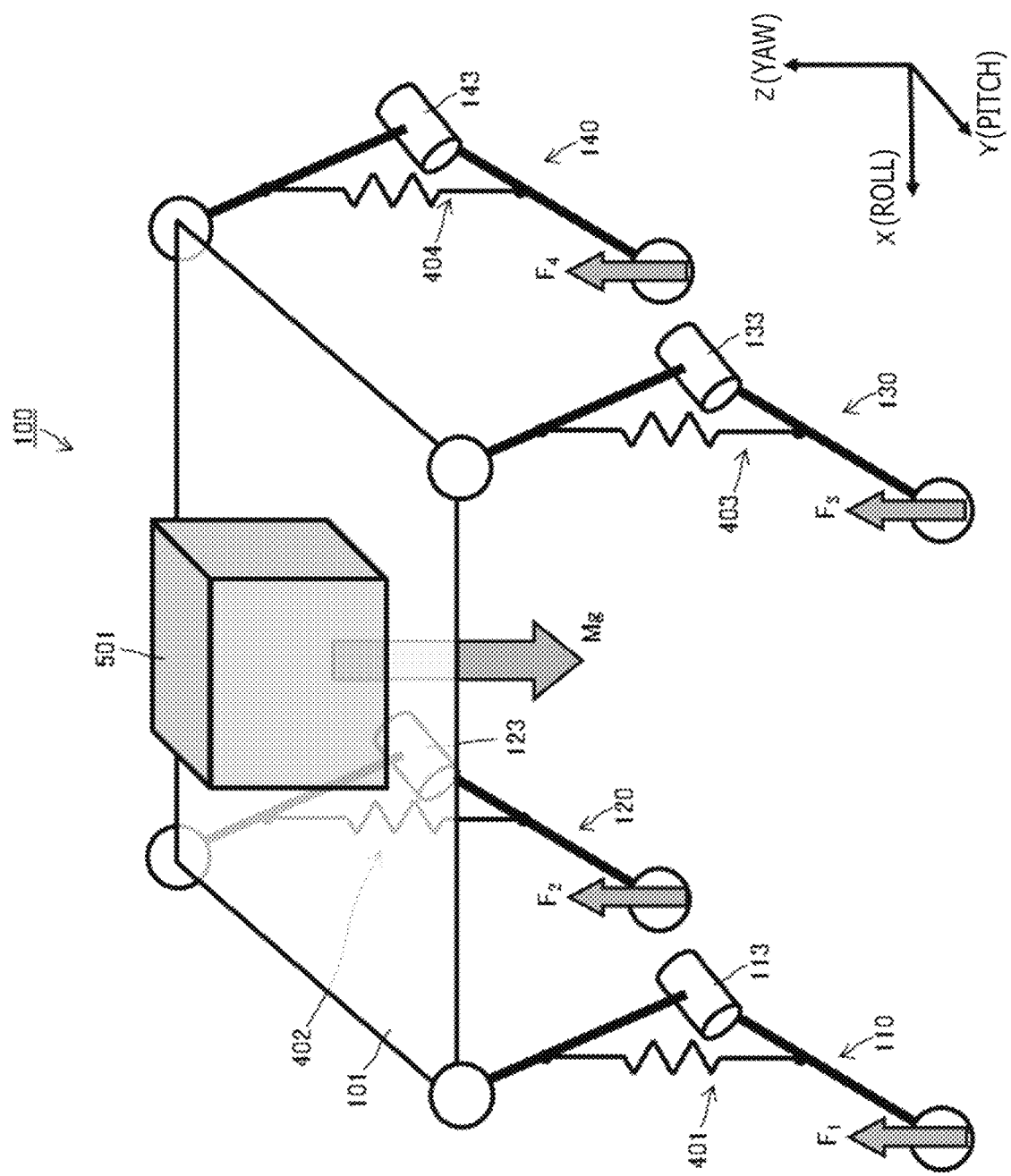
FIG. 5 is a diagram illustrating luggage being placed on the robot apparatus 100.

Additionally, the robot apparatus 100 is a luggage carriage robot that conveys the luggage placed on the loading portion 101 (as described above). FIG. 5 schematically illustrating luggage 501 with a mass $m_{luggage}$ being placed on the loading portion 101 of the robot apparatus 100. In this case, a load Mg acts, the load Mg corresponding to the weight of the robot apparatus 100 main body plus the weight of the luggage 501 (in this regard, $M=m+m_{luggage}$).

The load Mg is assumed to be evenly distributed over the movable legs 110, 120, 130, and 140, leading to action of the same floor reaction force F. Additionally, all of the springs 401, 402, 403, and 404 are assumed to each have the spring constant K. In this case, if the movable legs 110, 120, 130, and 140 are assembled with the springs 401, 402, 403, and 404 with the initial displacement amount $\Delta x$ applied to the springs such that the restoring force $K \cdot \Delta x$ that counters the floor reaction force F (=Mg/4) acts on each of the springs 401, 402, 403, and 404, the loads imposed on the joint portions 113, 123, 133, and 143 can be reduced to make the robot apparatus 100 stationary in the "reference posture" in which the height H from the floor surface to the loading portion 101 is constant and in which the placement surface of the loading portion 101 lies level. At this time, it is substantially unnecessary to operate the actuators for driving the pitch axes of the joint portions 113, 123, 133, and 143.

However, the weight of the luggage 501 loaded on the robot apparatus 100 is not constant. Thus, when light luggage is loaded, the restoring force $K \cdot \Delta x$ for load compensation acting on each of the springs 401, 402, 403, and 404 is excessive, making the height from the floor surface to the loading portion 101 larger than the desired height H. In contrast, when heavy luggage is loaded, the restoring force $K \cdot \Delta x$ for load compensation acting on each of the springs 401, 402, 403, and 404 is small, making the height from the floor surface to the loading portion 101 smaller than the desired height H.

Additionally, the load Mg is not necessarily evenly distributed over the movable legs 110, 120, 130, and 140. When the movable legs 110, 120, 130, and 140 are assembled with the springs 401, 402, 403, and 404 such that the restoring force $K \cdot \Delta x$ acts equally on all of the springs 401, 402, 403, and 404, those of the movable legs 110, 120, 130, and 140 over which a load larger than the restoring force $K \cdot \Delta x$ is distributed are contracted, and in contrast, those of the movable legs 110, 120, 130, and 140 over which a load smaller than the restoring force $K \cdot \Delta x$ is distributed are extended. In other words, the placement surface of the loading portion 101 is tilted to cause deviation from the "reference posture," leading to the risk of slippage of the luggage.

The luggage placed on the loading portion 101 does not necessarily always have the same weight, and the load is not necessarily distributed evenly. Accordingly, the restoring force for load compensation is assumed to be different for each of the movable legs 110, 120, 130, and 140 and to vary. Thus, the present embodiment introduces a mechanism for enabling any initial displacement amount to be set independently for each of the springs 401, 402, 403, and 404 and causing an individual restoring force for load compensation to act on each of the springs 401, 402, 403, and 404 to allow independent load compensation to be performed on each of the movable legs.

First, with reference to FIGS. 6 to 8, an initial displacement amount $x_{adj}$ set for the springs will be described. A spring 600 as used herein is assumed to be, for example, at least any one of the springs 401, 402, 403, and 404 applied to load compensation at the joint pitch axes of the movable legs of the robot apparatus 100.

Figure 6:
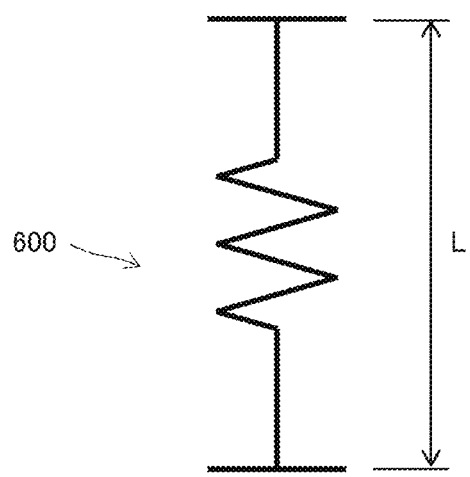
FIG. 6 is a diagram illustrating an initial displacement amount to be set for a spring for load compensation.
Figure 7:
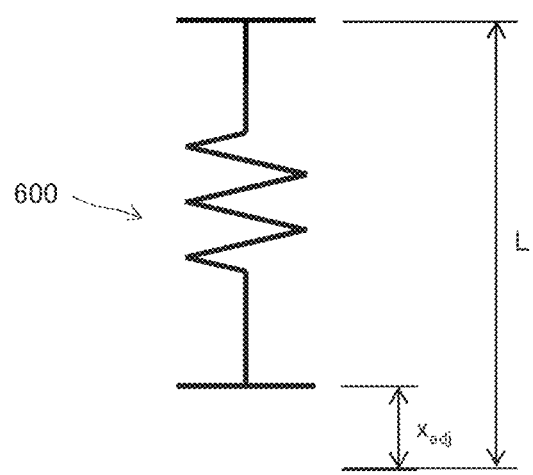
FIG. 7 is a diagram illustrating the initial displacement amount to be set for the spring for load compensation.

FIG. 6 illustrates the spring 600 with a natural length L. FIG. 7 illustrates the spring 600 contracted in response to application of the initial displacement amount $x_{adj}$. For example, by driving an actuator not illustrated to displace a lower end of the spring 600 upward by the initial displacement amount $x_{adj}$ and at that position, locking the actuator, the spring 600 can be held with low power consumption, with the initial displacement amount $x_{adj}$ as illustrated in FIG. 7 applied to the spring 600.

Note that locking of the actuator can be achieved by using, for example, a fixation mechanism such as a brake or a plunger. Alternatively, in a case where an ultrasonic motor or a brushless motor is utilized as the actuator, when power is cut off, the actuator itself exerts a high holding force, thus eliminating a need for a fixation mechanism such as a brake.

Figure 8:
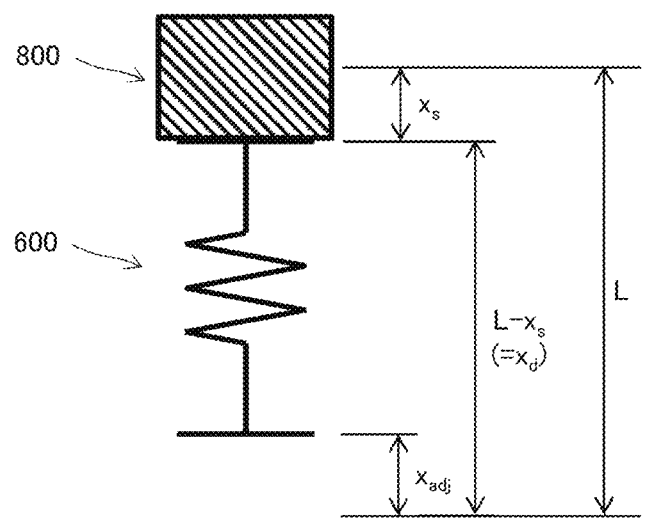
FIG. 8 is a diagram illustrating the initial displacement amount to be set for the spring for load compensation.

FIG. 8 illustrates a load of luggage 800 being applied to an upper end of the spring 600 contracted in response to application of the initial displacement amount $x_{adj}$, the spring 600 being further contracted by $x_s$. A load 800 as used herein corresponds to a component force resulting from distribution, to the movable leg, of the total Mg of the weight m of the robot apparatus 100 main body and the load of the loaded luggage $m_{luggage}$.

In a state illustrated in FIG. 8, the spring 600 is shortened by $x_{adj}+x_s$ compared to the natural length L. Consequently, assuming that K is the spring constant of the spring 600, a restoring force F indicated by Equation (1) below acts on the spring 600.

[Math. 1]

$$F = K \cdot (x_s + x_{adj}) \quad (1)$$

The restoring force F is balanced with the load 800 applied to the spring 600. Additionally, a contraction amount $x_s$ of the spring 600 contracted when the load 800 is applied can be represented by Equation (2) below by using the initial displacement amount $x_{adj}$

[Math. 2]

$$x_s = \frac{F}{K} - x_{adj} \quad (2)$$

In this regard, an upper end position $x_d$ of the spring 600 that is desired when the load 800 is applied corresponds to the reference posture of the robot apparatus 100. For convenience, the upper end position $x_d$ of the spring 600 is hereinafter referred to as the "reference posture." A relation represented by Equation (3) below is satisfied between the reference posture $x_d$ and the contraction amount $x_s$ of the spring 600, as can be seen in FIG. 8.

[Math. 3]

$$L - x_s = x_d \quad (3)$$

Then, when Equation (2) above is used to delete the contraction amount $x_s$ of the spring 600 from Equation (3), the initial displacement amount $x_{adj}$ to be applied to the spring 600 is represented by Equation (4) by using the reference posture $x_d$ of the robot apparatus 100.

[Math. 4]

$$x_{adj} = \frac{F}{K} + x_d - L \quad (4)$$

Consequently, according to Equation (4) above, the initial displacement amount $x_{adj}$ of the spring 600 can be determined according to the load 800 applied to the spring 600 (balanced with the restoring force F).

As also can be seen in FIG. 8, applying the appropriate initial displacement amount $x_{adj}$ to the spring 600 allows the upper end position of the spring 600 to align with the reference posture $x_d$ of the robot apparatus 100.

Figure 9:
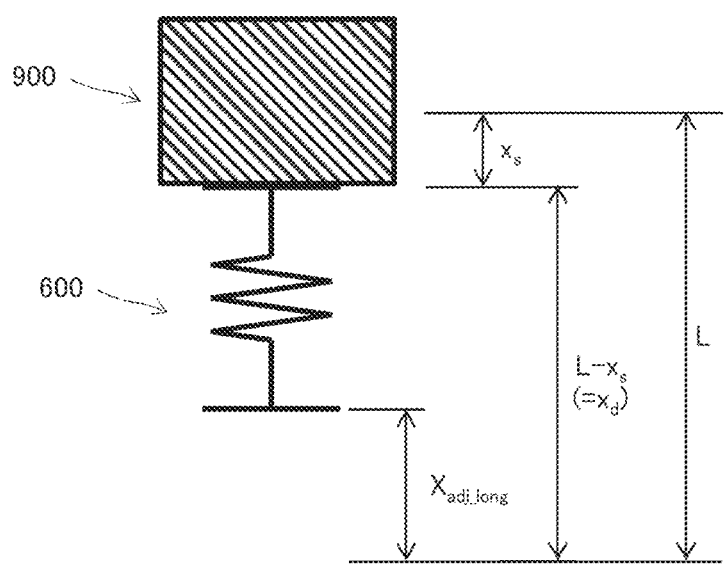
FIG. 9 is a diagram illustrating the initial displacement amount to be set for the spring for load compensation.
Figure 10:
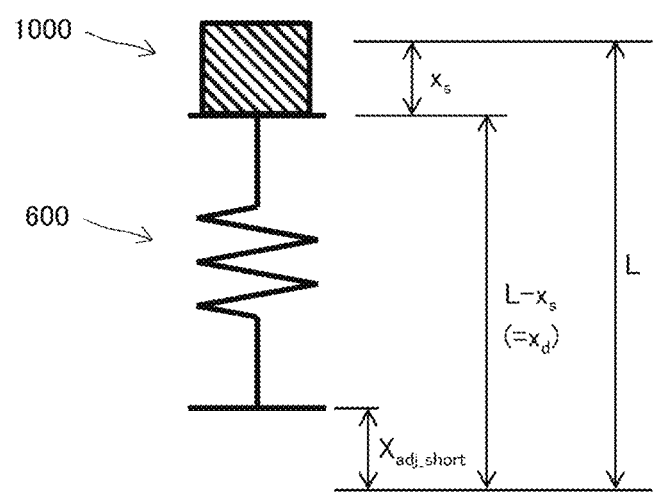
FIG. 10 is a diagram illustrating the initial displacement amount to be set for the spring for load compensation.

Additionally, the weight of the luggage 800 applied to the spring 600 varies according to the mass $m_{luggage}$ of the luggage placed on the loading portion 101. However, adaptive variation of the initial displacement amount $x_{adj}$ allows the upper end position of the spring 600 to be kept in the reference posture $x_d$ of the robot apparatus 100. For example, as illustrated in FIG. 9, when luggage 900 with a larger weight is placed, applying a larger initial displacement amount $x_{adj\_long}$ to the spring 600 allows the upper end position of the spring 600 to be kept in the reference posture $x_d$ of the robot apparatus 100. In contrast, as illustrated in FIG. 10, when luggage 1000 with a small weight is placed, applying a small initial displacement amount $x_{adj\_short}$ to the spring 600 similarly allows the upper end position of the spring 600 to be kept in the reference posture $x_d$ of the robot apparatus 100.

Figure 11:
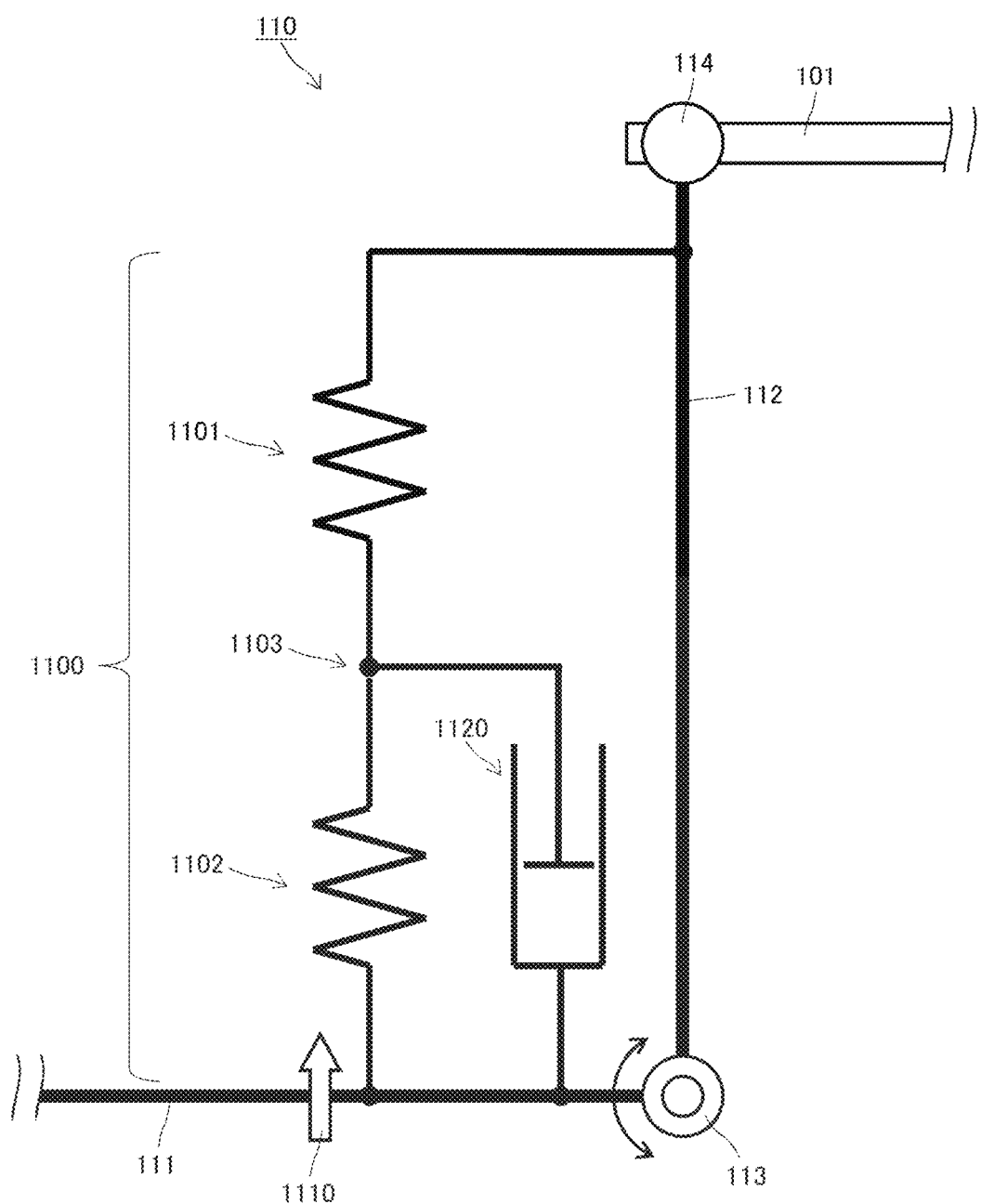
FIG. 11 is a diagram illustrating a configuration example of a movable leg 110 to which a load compensation mechanism enabling the initial displacement amount to be adjusted is applied.

FIG. 11 illustrates a configuration example in which a load compensation mechanism enabling the initial displacement amount to be adjusted is applied to the movable leg 110. However, the load compensation mechanism is intended to compensate for a load acting on the joint portion 113 around the pitch axis, the joint portion 113 connecting the link 111 and the link 112. Additionally, for simplification, in this case, the degree of freedom of the joint portion 114 connecting the upper end of the link 112 to the loading portion 101 is neglected. Note that the illustration and description of the other movable legs 120, 130, and 140 are omitted. However, it should be appreciated that a load compensation mechanism similar to that for the movable leg 110 illustrated in FIG. 11 is applied to each of the movable legs 120, 130, and 140.

The load compensation mechanism 1100 includes two springs 1101 and 1102 disposed in series. The load compensation mechanism 1100 is attached to the movable leg 110 so as to stride over the joint portion 113, with one end of the load compensation mechanism 1100 fixed to the link 112 and the other end of the load compensation mechanism 1100 fixed to the link 111. Consequently, the load compensation mechanism 1100 elastically supports the link 111 to the link 112.

Additionally, when the load including the weight of the robot apparatus 100 and the weight of the luggage (not illustrated in FIG. 11) placed on the loading portion 101 is applied to the movable leg 110, a torque acts to rotate the joint portion 113 of the movable leg 110 around the pitch axis. When the link 111 rotates around the pitch axis via a joint portion 112 with respect to the link 112, as represented by an arrow 1110, the springs 1101 and 1102 are contracted and a restoring force that acts to extend the springs 1101 and 1102 to the original lengths is generated. Consequently, the load compensation mechanism 1100 can be said to elastically support the link 111 to the link 112 to compensate for at least a portion of the load acting on the joint portion 113 around the pitch axis.

The load compensation mechanism 1100 further includes an initial displacement amount setting section 1120 that can set any initial displacement amount for the springs 1101 and 1102. In an example illustrated in FIG. 11, the initial displacement amount setting section 1120 is configured as a linear actuator driving, in the up and down direction in the sheet of FIG. 11, a midpoint position 1103 between the spring 1101 and the spring 1102 connected in series. When the linear actuator 1120 is driven to displace the midpoint position 1103 upward in the sheet of FIG. 11 to apply the initial displacement amount $x_{adj}$, the spring 1101 is contracted to generate a restoring force that acts to extend the spring 1101, whereas the other spring 1102 is extended to generate a restoring force that acts to contract the spring 1102. The load compensation mechanism 1100 as a whole applies, to between the link 111 and the link 112, a restoring force (in other words, an assist force for resisting the load) acting downward in the sheet of FIG. 11, allowing compensation for at least a portion of the load acting on the joint portion 113 around the pitch axis. Then, the linear actuator 1120 locks the joint portion 113 at a position where the initial displacement amount $x_{adj}$ is applied.

Incidentally, when the linear actuator 1120 is driven to displace the midpoint position 1103 downward in the sheet of FIG. 11 (this displacement is not illustrated in FIG. 11), the spring 1101 is extended to generate a restoring force that acts to contract the spring 1101, whereas the other spring 1102 is contracted to generate a restoring force that acts to extend the spring 1102. The load compensation mechanism 1100 as a whole can apply, to between the link 111 and the link 112, a restoring force acting upward in the sheet of FIG. 11.

Figure 12:
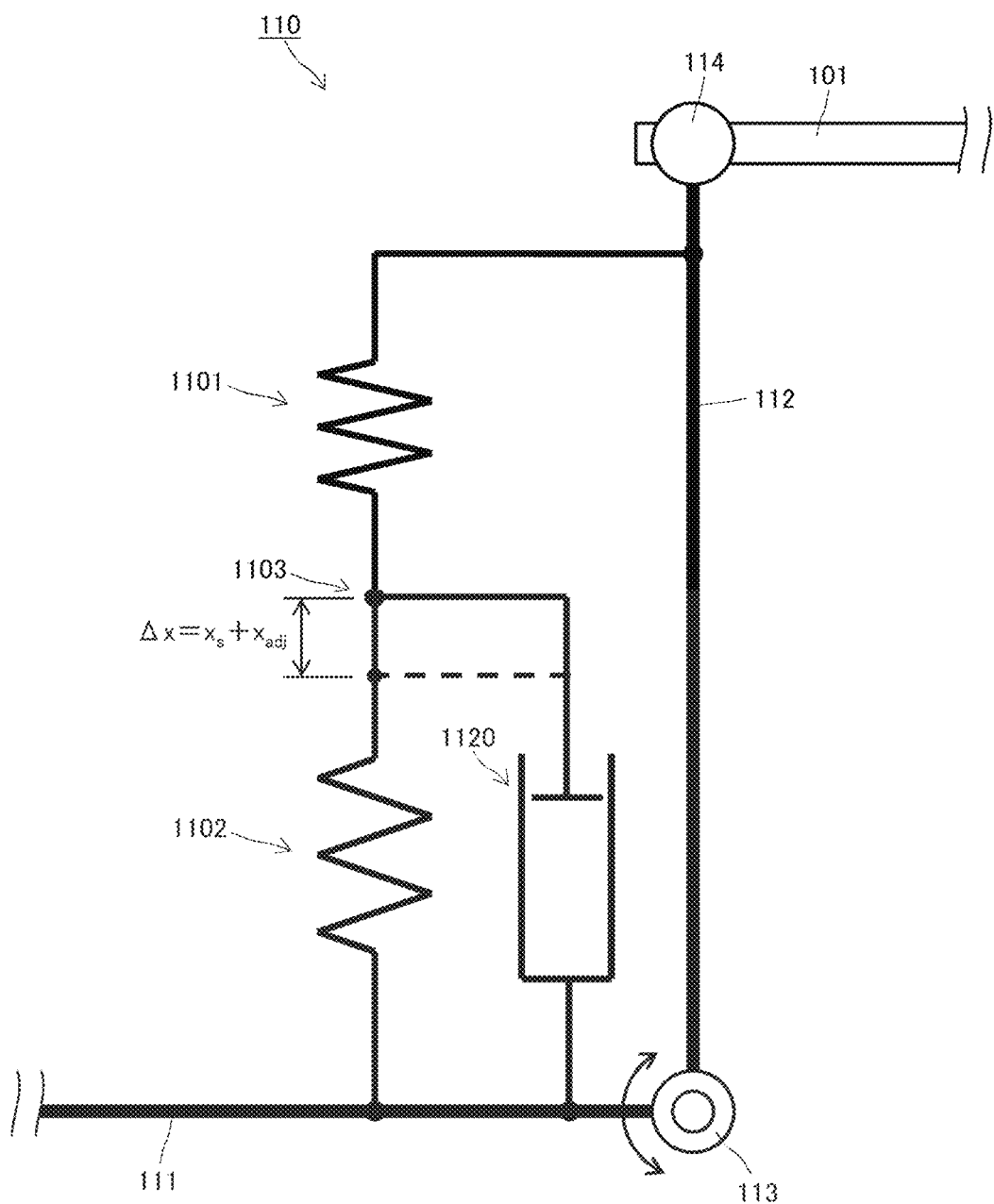
FIG. 12 is a diagram illustrating an operation example of a load compensation mechanism 1100 illustrated in FIG. 11.

FIG. 12 illustrates the linear actuator 1120 being driven to displace the midpoint position 1103 upward in the sheet of FIG. 12, applying the initial displacement amount to the load compensation mechanism 1100.

In a case where the midpoint position 1103 is displaced upward by $\Delta x$ in the sheet of FIG. 12, the spring 1101 is contracted by $\Delta x$, whereas the spring 1102 is extended by $\Delta x$. Then, assuming that the spring 1101 and the spring 1102 both have a natural length of L/2 and a spring constant of K/2, the load compensation mechanism 1100 as a whole exerts a restoring force $K \cdot \Delta x/2 + K \cdot \Delta x/2 = K \cdot \Delta x$ downward in the sheet of FIG. 12 to compensate for the load.

In this regard, the displacement amount $\Delta x$ of the midpoint position 1103 is the total of the initial displacement amount $x_{adj}$ of the midpoint position 1103 applied by a linear actuator 1102 used as the initial displacement amount setting section and the displacement amount $x_s$ of the midpoint position 1103 attributed to the weight of the robot apparatus 100 and the load of the luggage placed on the loading portion 101 (in other words, $\Delta x = x_{adj} + x_s$). Consequently, the load compensation mechanism 1100 applies, to between the link 111 and the link 112, the restoring force F indicated by Equation (5), compensating for at least a portion of the load acting on the joint portion 113 around the pitch axis.

[Math. 5]
$$F = K \cdot (x_s + x_{adj}) \quad (5)$$

The displacement amount of the midpoint position 1103 displaced when the weight of the robot apparatus 100 and the load of the luggage placed on the loading portion 101 are applied can be represented by Equation (6) below by using the initial displacement amount $x_{adj}$ applied to the linear actuator 1120.

[Math. 6]
$$x_s = \frac{F}{K} - x_{adj} \quad (6)$$

The upper end position of the link 112 that is desired when the weight of the robot apparatus 100 and the load of the luggage placed on the loading portion 101 are applied corresponds to the reference posture of the robot apparatus 100. Then, the displacement amount $x_d$ of the midpoint position 1103 from the natural length (=L/2) of the springs 1101 and 1102 is in a unique relation with the desired upper end position of the link 112. For convenience, the displacement amount $x_d$ of the midpoint position 1103 is hereinafter referred to as the "reference posture." A relation represented by Equation (7) below is satisfied between the reference posture $x_d$ and the contraction amount $x_s$ of the spring 600.

[Math. 7]
$$L - x_s = x_d \quad (7)$$

Then, when Equation (6) above is used to delete the contraction amount $x_s$ of the spring 600 from Equation (7), the initial displacement amount $x_{adj}$ to be applied to the springs 1101 and 1102 by the linear actuator 1120 is represented by Equation (8) by using the reference posture $x_d$ of the robot apparatus 100.

[Math. 8]
$$x_{adj} = \frac{F}{K} + x_d - L \quad (8)$$

By locking the linear actuator 1120 at the position where the initial displacement amount $x_{adj}$ is applied to the springs 1101 and 1102, at least a portion of the load acting on the joint portion 113 around the pitch axis can be compensated for by the load compensation mechanism 1100 when the robot apparatus 100 with luggage with any weight placed on the loading portion 101 is held in the reference posture.

As illustrated in FIGS. 11 and 12, the two coil springs 1101 and 1102 may be provided, and a preload may be applied to between the springs 1101 and 1102. This enables a restoring force to be generated even with the joint portion 113 bent around the pitch axis, with no additional driving source, thus allowing load compensation performance to be improved.

C. Combination of Load Compensation Mechanism and Series Elastic Actuator

As the actuator rotating and driving the joint portion 113 around the pitch axis, a rotation motor with a reduction gear may be applied, but for example, a series elastic actuator (SEA) may be applied. Needless to say, the series elastic actuator may also be applied similarly to the joint portions 123, 133, and 143 of the other movable legs 120, 130, and 140.

The series elastic actuator is configured to transmit power output from a driving motor to an output side target via a spring used as an elastic member (see, for example, PTL 3) and has the feature that the series elastic actuator has a high compliance and mitigate shock applied to an apparatus including the series elastic actuator, compared to actuators of other types. Consequently, using the series elastic actuator for the joint portion 113 of the robot apparatus 100 has the advantage of mitigating shock given by the ground surface when a toe of the movable leg 110 comes into contact with the ground surface. Additionally, the series elastic actuator allows a load applied to the spring to be measured on the basis of the measured value of displacement amount of the spring and the spring constant of the spring. The load thus measured is related to the power actually transmitted to the output side target, and thus the measurement result for the load can be utilized for driving and controlling the series elastic actuator.

Figure 13:
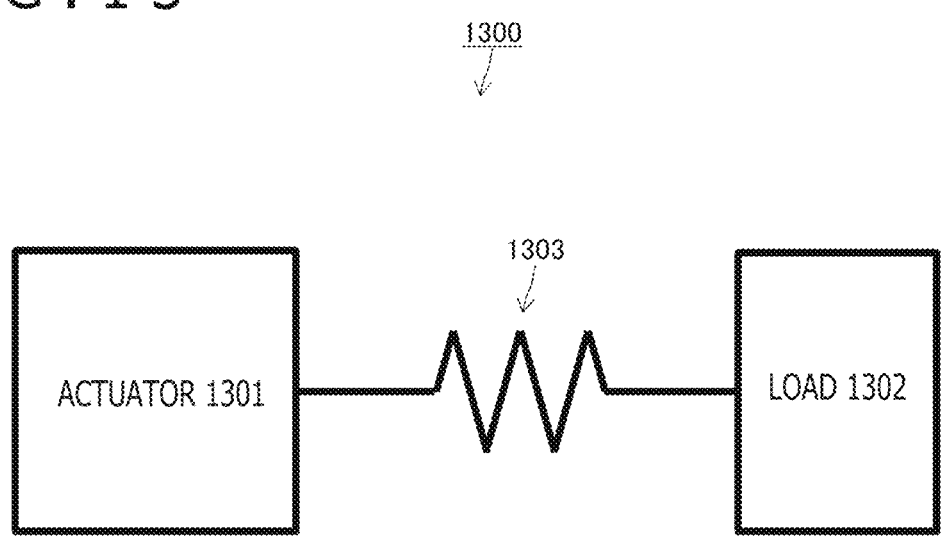
FIG. 13 is a diagram schematically illustrating a configuration of a series elastic actuator.

FIG. 13 schematically illustrates the configuration of the series elastic actuator. A series elastic actuator 1300 illustrated includes an actuator 1301 and a load 1302 connected in series by using an elastic body 1303 such as a spring. The elastic body 1303 having a higher compliance than the other mechanical elements intercepts transmission of a high-frequency wave between the actuator 1301 and the load 1302, allowing prevention of transmission of frequent, slight displacement of the actuator 1301 and the like. Additionally, micro vibration and backlash are filtered by the elastic body 1303, enabling more accurate force control.

Additionally, energy can be accumulated in (or released from) the elastic body 1303, and thus the series elastic actuator 1300 allows efficient motion to be achieved. A force accumulated during the preceding operation can be released during the next operation, enabling an efficient operation as performed by animals using muscles.

Figure 14:
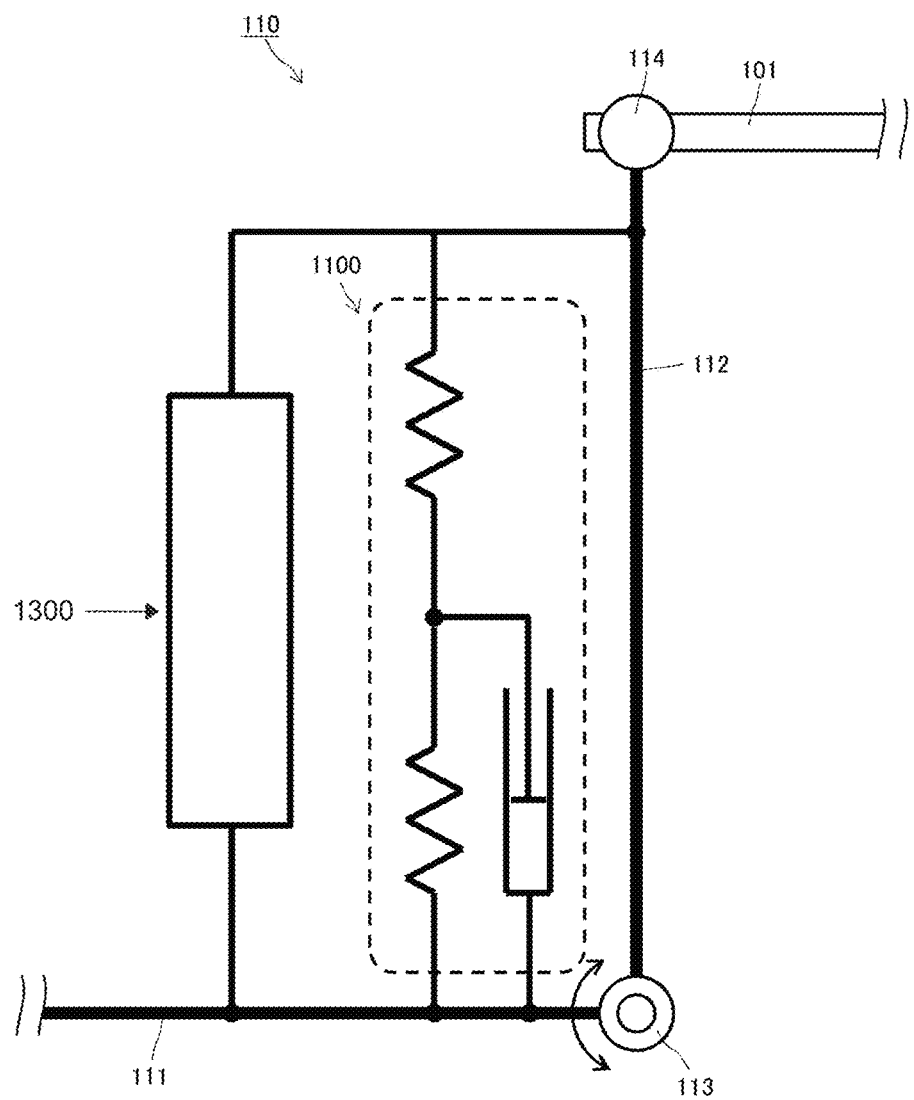
FIG. 14 is a diagram illustrating a configuration example of the movable leg 110 including a combination of the load compensation mechanism and the series elastic actuator.

FIG. 14 schematically illustrates a configuration example in which the load compensation mechanism 1100 illustrated in FIG. 11 and the series elastic actuator 1300 as illustrated in FIG. 13 are combined in an area around the joint portion 113 of the movable leg 110. Both the load compensation mechanism 1100 and the series elastic actuator 1300 are components driven in a longitudinal direction and are compatible with each other in terms of mechanical design. For example, by the use of some common components or the like, the load compensation mechanism 1100 and the series elastic actuator 1300 having reduced sizes and weights can be mounted following the shape of the link 112.

The series elastic actuator 1300 typically includes a force detection section (not illustrated). For example, even with a temporal change in the spring constant of the spring 1101 or 1102 in the load compensation mechanism 1100, the change can be corrected on the basis of a detection result from the force detection section. Consequently, for the load compensation mechanism 1100, a spring that includes a material such as carbon fiber reinforced plastic (CFRP) which is light but which changes over time can be utilized. Additionally, by using an ultrasonic motor or a brushless motor for an initial displacement amount setting section 1103, the weights of the driving mechanism and the lock mechanism for the midpoint position 1103 can be reduced.

D. Load Compensation Control for Plurality of Movable Legs

When the load compensation mechanism enabling any initial displacement amount to be set as illustrated in FIGS. 11 to 14 is disposed at each of the movable legs 110, 120, 130, and 140 of the robot apparatus 100, the load compensation operation can be achieved independently for each of the movable legs 110, 120, 130, and 140.

In the example illustrated in FIGS. 3 to 5, the load Mg is assumed to act distributively on the movable legs 110, 120, 130, and 140, the load Mg including the weight mg of the robot apparatus 100 main body and the load $m_{luggage}$ of the luggage placed on the loading portion 101. In such a case, to perform load compensation to set the movable legs 110, 120, 130, and 140 in the same reference posture $x_d$, it is sufficient if an equal initial displacement amount $x_{adj}$ is set for each of the movable legs 110, 120, 130, and 140 to cause the same restoring force F to act on each of the movable legs 110, 120, 130, and 140.

However, the weight mg of the robot apparatus 100 main body does not necessarily act distributively on the movable legs 110, 120, 130, and 140, or rather such design may be difficult.

Figure 15:
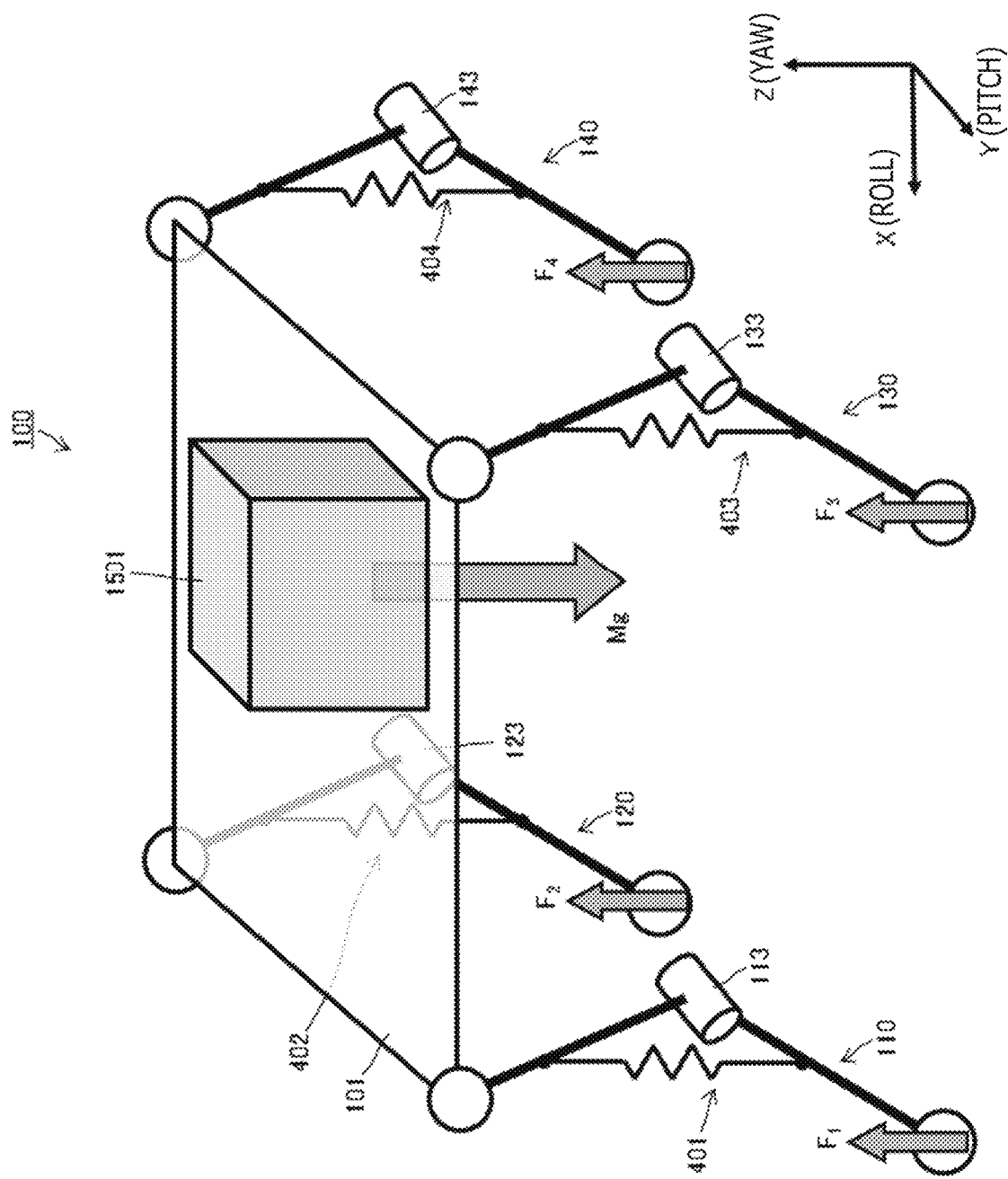
FIG. 15 is a diagram illustrating luggage being placed on the robot apparatus 100.

Additionally, in the example illustrated in FIG. 5, the luggage 501 is placed approximately in the center of the placement surface of the loading portion 101, and thus the load Mg is easily evenly distributed over the movable legs 110, 120, 130, and 140. On the other hand, as illustrated in FIG. 15, in a case where luggage 1501 is placed on the placement surface of the loading portion 101 at a far distance from the center of the placement surface, different floor reaction forces $F_1$, $F_2$, $F_3$, and $F_4$ are assumed to act on the soles of the respective movable legs 110, 120, 130, and 140. In such a case, even with the same reference posture $x_d$ for the movable legs 110, 120, 130, and 140, different initial displacement amounts $x^{(1)}_{adj}$, $x^{(2)}_{adj}$, $x^{(3)}_{adj}$, and $x^{(4)}_{adj}$ need to be set for the respective movable legs 110, 120, 130, and 140 according to the respective floor reaction forces $F_1$, $F_2$, $F_3$, and $F_4$, as indicated by Equations (9) to (12).

[Math. 9]
$$x^{(1)}_{adj} = \frac{F_1}{K} + x_d - L \qquad (9)$$

[Math. 10]
$$x^{(2)}_{adj} = \frac{F_2}{K} + x_d - L \qquad (10)$$

[Math. 11]
$$x^{(3)}_{adj} = \frac{F_3}{K} + x_d - L \qquad (11)$$

[Math. 12]
$$x^{(4)}_{adj} = \frac{F_4}{K} + x_d - L \qquad (12)$$

For example, a heavier load acts on a movable leg closer to the luggage placed, and thus a larger initial displacement amount needs to be set for this movable leg. However, a smaller load acts on a movable leg at a farther distance from the luggage, and thus it is sufficient if a smaller initial displacement amount is set for this movable leg.

Note that the position where the luggage is placed may be measured on the basis of detection results from the touch sensor 213 (described above) laid on the placement surface of the loading portion 101 and that the position of the center of gravity including the luggage may be calculated, to derive the floor reaction forces $F_1$, $F_2$, $F_3$, and $F_4$ that act on the toes of the movable legs 110, 120, 130, and 140. Alternatively, force sensors may be installed at the toes of the movable legs 110, 120, 130, and 140 to directly measure the floor reaction forces $F_1$, $F_2$, $F_3$, and $F_4$.

Figure 16:
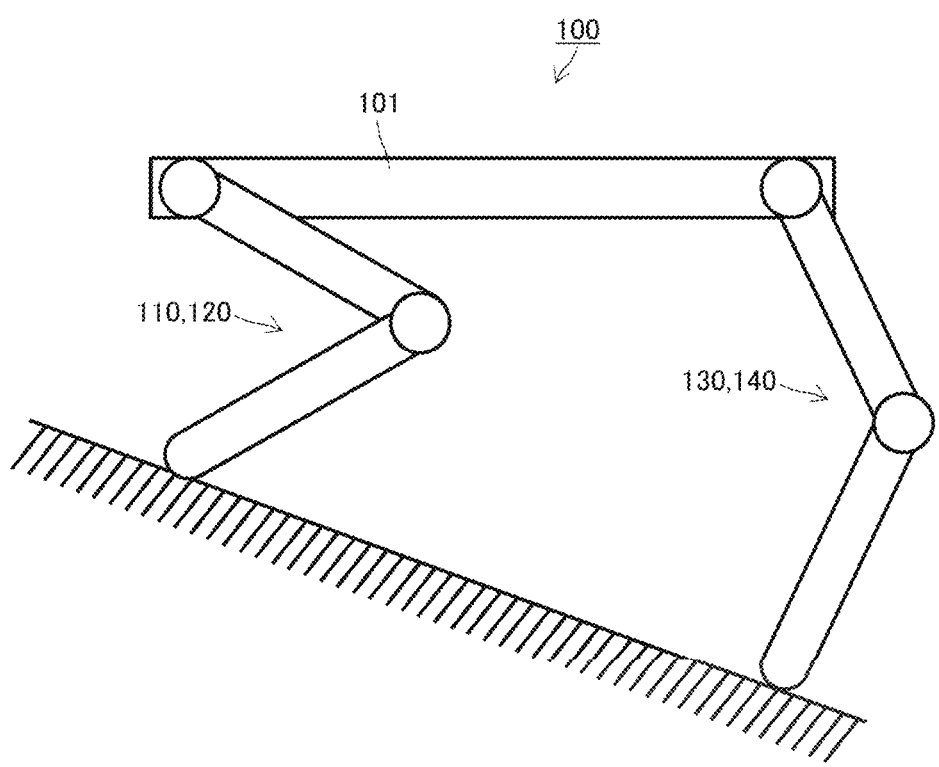
FIG. 16 is a diagram illustrating the robot apparatus 100 standing hallway up a hill.

Additionally, in a case where the robot apparatus 100 stands on a level floor surface, the same reference posture $x_d$ may be used for each of the movable legs 110, 120, 130, and 140 to keep the placement surface of the loading portion 101 level. However, in a case where the robot apparatus 100 stands on a hill or a bumpy, irregular ground, varying reference postures (or varying heights from the toe to the loading portion 101) are used for the respective movable legs 110, 120, 130, and 140 to keep the placement surface of the loading portion 101 level. FIG. 16 illustrates the robot apparatus 100 standing halfway up a hill. In the example of the hill illustrated in FIG. 16, it will be appreciated that the reference postures $x^{(1)}_d$ and $x^{(2)}_d$ of the movable legs 110 and 120 used as front legs are short, whereas the reference postures $x^{(3)}_d$ and $x^{(4)}_d$ of the movable legs 130 and 140 used as rear legs are long.

In such a case, as indicated by Equations (13) to (16), different initial displacement amounts $x^{(1)}_{adj}$, $x^{(2)}_{adj}$, $x^{(3)}_{adj}$, and $x^{(4)}_{adj}$ need to be set for the respective movable legs 110, 120, 130, and 140 according to the respective floor reaction forces $F_1$, $F_2$, $F_3$, and $F_4$ such that the movable legs 110, 120, 130, and 140 correspond to the different reference postures $x^{(1)}_d$, $x^{(2)}_d$, $x^{(3)}_d$, and $x^{(4)}_d$.

[Math. 13]
$$x^{(1)}_{adj} = \frac{F_1}{K} + x^{(1)}_d - L \quad (13)$$

[Math. 14]
$$x^{(2)}_{adj} = \frac{F_2}{K} + x^{(2)}_d - L \quad (14)$$

[Math. 15]
$$x^{(3)}_{adj} = \frac{F_3}{K} + x^{(3)}_d - L \quad (15)$$

[Math. 16]
$$x^{(4)}_{adj} = \frac{F_4}{K} + x^{(4)}_d - L \quad (16)$$

Note that the sensor included in the external sensor section 210, such as the LIDAR, the TOF sensor, or the laser range sensor (described above), may be used to measure or estimate the distance from the placement surface of the loading portion 101 to the toe of each of the movable legs 110, 120, 130, and 140 and that, based on measurement or estimation results, reference postures $x^{(1)}_d$, $x^{(2)}_d$, $x^{(3)}_d$, and $x^{(4)}_d$ of the respective movable legs 110, 120, 130, and 140 may be acquired.

Figure 17:
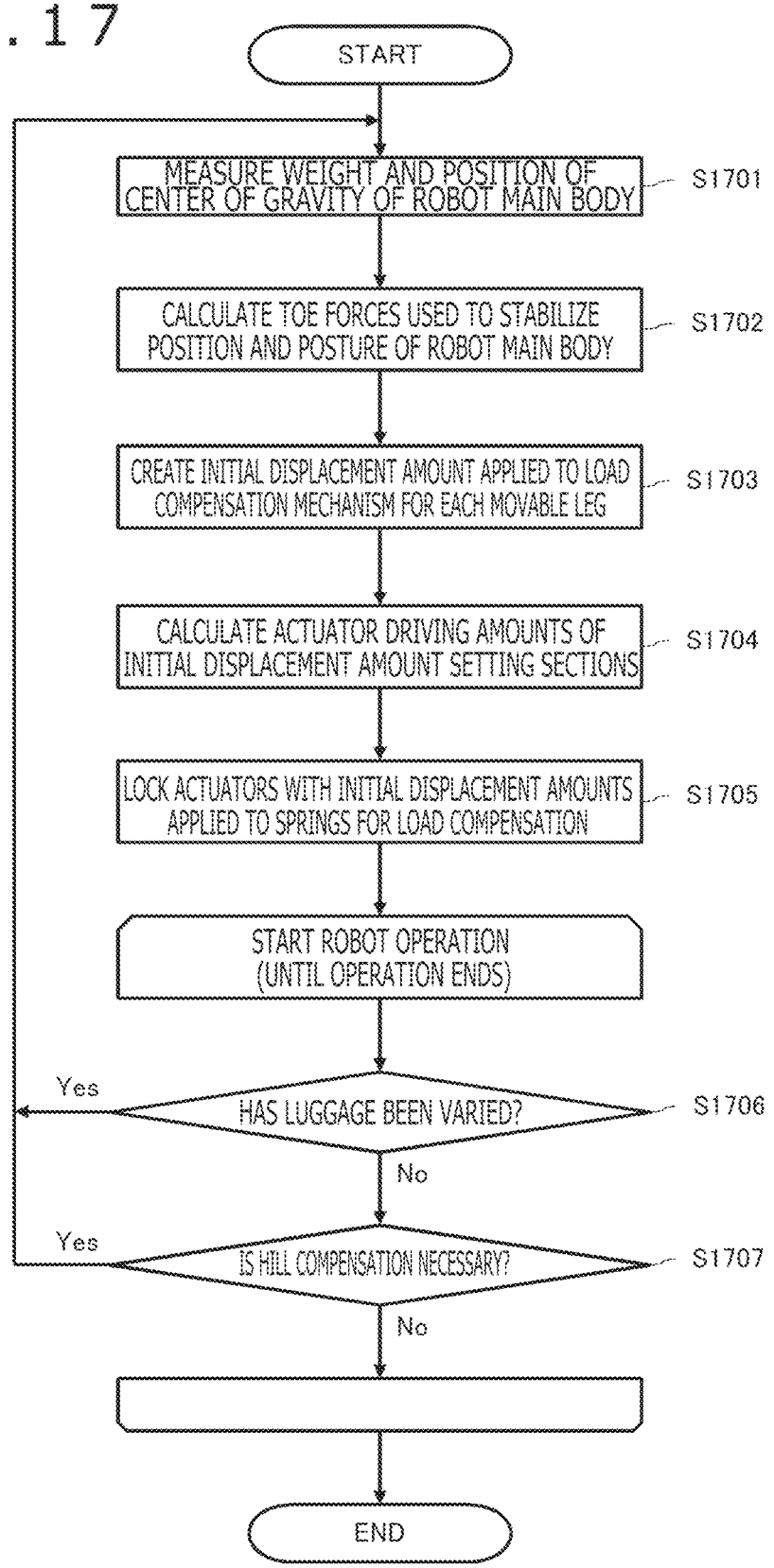
FIG. 17 is a flowchart illustrating a processing procedure for performing load compensation in the robot apparatus 100.

FIG. 17 illustrates, in a flowchart form, a processing procedure for performing load compensation on the movable legs 110, 120, 130, and 140 in the robot apparatus 100. The illustrate processing procedure is basically executed by the main control section 231 used a subject.

Before execution of the processing procedure, information related to the reference posture of the robot apparatus 100 is set. The information related to the reference posture is specifically set in the format of the displacement amount $x_d$ with respect to the natural length of the load compensation spring for each of the movable legs 1110, 120, 130, and 140.

Then, on the basis of information read out from the memory 231A, detection results from the external sensor section 210, and the like, the main control section 231 measures the weights of the robot apparatus 100 main body and the luggage placed on the loading portion 101 and the position of the center of gravity of the robot apparatus 100 (step S1701).

Then, the main control section 231 calculates the toe forces $F_1$, $F_2$, $F_3$, and $F_4$ of the respective movable legs 110, 120, 130, and 140 required to stabilize the position and the posture of the robot apparatus 100 main body or the loading portion 101 (step S1702).

Then, on the basis of the toe forces $F_1$, $F_2$, $F_3$, and $F_4$, the main control section 231 calculates the initial displacement amounts $x^{(1)}_{adj}$, $x^{(2)}_{adj}$, $x^{(3)}_{adj}$, and $x^{(4)}_{adj}$ to be set for the load compensation mechanisms for the movable legs 110, 120, 130, and 140, according to Equations (9) to (12) described above or Equations (13) to (16) described above (step S1703).

Then, the main control section 231 calculates actuator driving amounts for the initial displacement amount setting sections 1120 for the movable legs 110, 120, 130, and 140, the actuator driving amounts being used to achieve the initial displacement amounts calculated in step S1703 (step S1704), and provides control commands to the sub-control sections 241, 242, 243, and 244.

The sub-control sections 241, 242, 243, and 244 drive the actuators according to control commands from the main control section 231 to lock the actuators with the initial displacement amounts $x^{(1)}_{adj}$, $x^{(2)}_{adj}$, $x^{(3)}_{adj}$, and $x^{(4)}_{adj}$ applied to the load compensation springs for the movable legs 110, 120, 130, and 140 (step S1705).

By applying the initial displacement amounts $x^{(1)}_{adj}$, $x^{(2)}_{adj}$, $x^{(3)}_{adj}$, and $x^{(4)}_{adj}$ to the load compensation springs for the movable legs 110, 120, 130, and 140 according to steps S1701 to S1705, the robot apparatus 100 is set to allow the reference posture to be maintained using reduced power consumption.

Then, in a case where the luggage placed on the loading portion 101 is varied (Yes in step S1706) after the robot apparatus 100 starts any operation and before the robot apparatus 100 ends the operation, the robot apparatus 100 returns to step S1701 to re-set the initial displacement amounts $x^{(1)}_{adj}$, $x^{(2)}_{adj}$, $x^{(3)}_{adj}$, and $x^{(4)}_{adj}$ for the load compensation springs for movable legs 110, 120, 130, and 140. The "variation" of the luggage as used herein is assumed to include an increase or a decrease in the amount of luggage and a variation in the position of the luggage placed on the placement surface of the loading portion 101. In addition, the following case may be considered to correspond to the "variation" as used herein. That is, during the operation of a bot apparatus 100, one or some of the movable legs become unusable due to failure or destruction and are thus, and increased burdens are placed on the remaining normal movable legs.

Additionally, in a case where the robot apparatus 100 moves to a hill, an irregular ground, or the like, and the reference posture $x_d$ needs to be changed in order to keep the placement surface of the loading portion 101 level (Yes in step S1707), the robot apparatus 100 returns to step S1701 to re-set the initial displacement amounts $x^{(1)}_{adj}$, $x^{(2)}_{adj}$, $x^{(3)}_{adj}$, and $x^{(4)}_{adj}$ for the load compensation springs for movable legs 110, 120, 130, and 140.

Note that whether the robot apparatus 100 has entered a hill, an irregular ground, or the like, is detected by detecting, by the IMU (described above), tilt in the robot apparatus 100 main body or the loading portion 101, or by detecting, by the sole sensor or the like, a change in toe force in at least one of the movable legs 110, 120, 130, and 140.

In addition, in step S1707, a change in the state of the hill or the irregular ground is also detected, before processing returns to step S1701. For example, when the inclination of the hill changes or the robot apparatus 100 passes through the hill or the irregular ground and returns to a flat road surface, the reference posture $x_d$ needs to be changed in order to keep the placement surface of the loading portion 101 level.

Subsequently, when the robot apparatus 100 ends the operation, the processing also ends.

E. Effects

Finally, effects produced by the robot apparatus 100 according to the present embodiment will be described.

The robot apparatus 100 according to the present embodiment includes the load compensation mechanisms that are each provided in each of the movable legs 110, 120, 130, and 140 and that each utilize an elastic body such as a spring, and the initial displacement amount is set for the elastic body according to the weight of the robot apparatus 100 main body and the load of the luggage. This enables a reduction in power consummation of the joint driving actuators for keeping the robot apparatus 100 in the desired reference posture.

Additionally, for example, following the processing procedure as depicted in FIG. 17, according to each toe force calculated based on the weight of the robot apparatus 100 main body and the load of the luggage carried, the robot apparatus 100 according to the present embodiment performs an operation for applying the appropriate initial displacement amount to the load compensation elastic body to execute load compensation to allow the robot apparatus 100 to maintain the reference posture. Additionally, when, during the operation of the robot apparatus 100, the amount of the luggage is increased or reduced, the position of the luggage is varied, or the floor surface on which the robot apparatus 100 is installed is tilted, the initial displacement amount appropriate to the elastic body for load compensation is re-calculated and set again to enable load compensation in real time for allowing the robot apparatus 100 to maintain the reference posture.

Note that, in the above-described embodiment, the load compensation mechanisms are provided in all of the movable legs of the robot apparatus 100 but that, even when the load compensation mechanism is provided in only one movable leg or the load compensation mechanism are provided in some of the movable legs, the effect of reducing the power consumption of the joint driving actuators can be expected, the joint driving actuators being used to keep the robot apparatus 100 in the desired reference posture. Additionally, in a case where, during the operation of the robot apparatus 100, one or some of the movable legs become unusable due to failure, malfunction, or destruction, then by using the remaining normal movable legs to perform load compensation, the effect of reducing the power consumption of the joint driving actuators can be expected, the joint driving actuators being used to keep the robot apparatus 100 in the desired reference posture.

The robot apparatus 100 according to the present embodiment compensates for the load corresponding to the combination of the weight of the robot apparatus 100 main body and the weight of the luggage placed on the loading portion 101, allowing energy efficiency to be improved. As a result, the life of the battery 232 is extended, enabling the robot apparatus 100 to be operated for a long time.

By adjusting the initial displacement amount applied to the spring for load compensation provided in each of the movable legs 110, 120, 130, and 140, the robot apparatus 100 according to the present embodiment can maintain the reference posture without using an additional driving source, enabling a reduction in weight. Additionally, using two or more springs to impose a preload enables load compensation performance to be improved with no additional driving source.

In a case where series elastic actuators are used as actuators for pitch axis driving for the joint portions 113, 123, 133, and 143, a reduction in size and weight can be achieved by using some common components for the load compensation mechanisms and the series elastic actuators.

In the case of the robot apparatus 100 including a plurality of movable legs as in the present embodiment, the initial displacement amounts can be set independently for the respective movable legs to apply different assist forces to the respective movable legs for load compensation. Consequently, even in a case where varying loads are applied to the movable legs due to the position where the luggage is placed and the like, an appropriate assist force can be applied to each of the movable legs to suppress electric current consumption of the actuators for pitch axis driving, allowing the robot apparatus 100 to be operated for a long time. This also applies to a case where the robot apparatus 100 has entered a hill or an irregular ground or a case where some of the movable legs become inoperative due to failure, malfunction, destruction, or the like.

INDUSTRIAL APPLICABILITY

The technique disclosed herein has been described in detail with reference to the particular embodiment. However, obviously, a person skilled in the art may achieve modification or replacement of the embodiment without departing the spirits of the technique disclosed herein.

The embodiment in which the technique disclosed herein is applied to a four legged robot have been mainly described. However, the spirits of the technique disclosed herein are not limited to this. The technique disclosed herein can be similarly applied to a two legged robot, an arm robot, and various types of robot apparatuses including a multilink structure.

In short, the technique disclosed herein have been described in a form of illustration, and the details of the specification should not be interpreted in a limited manner. For determination of the spirits of the technique disclosed herein, claims should be taken into account.

Note that the technique disclosed herein can also take the following configurations.

(1)

A robot apparatus including:

one or more movable portions, a load compensation section utilizing an elastic body to compensate for a load acting on the movable portion, and an initial displacement amount setting section applying, to the elastic body, an initial displacement amount corresponding to a desired position or posture of the movable portion.

(2)

The robot apparatus according to (1) described above, in which
the initial displacement setting section includes an actuator displacing the elastic body by an initial displacement amount and locks the actuator with the elastic body remaining displaced by the initial displacement amount.

(3)

The robot apparatus according to (2) described above, in which
the movable portion is a leg including a joint portion having at least a degree of rotational freedom around a pitch axis, and
the load compensation section supports the joint portion.

(4)

The robot apparatus according to (3) described above, in which
the initial displacement amount setting section sets, on the basis of a toe force of the leg, an initial displacement amount for causing the elastic body to generate a restoring force for maintaining the desired position or posture.

(5)

The robot apparatus according to (4) described above, in which
the initial displacement amount setting section calculates an initial displacement amount to be applied to the elastic body, on the basis of a toe force of the leg calculated from a weight of luggage placed on the robot apparatus and a weight of the robot apparatus main body and a position of a center of gravity.

(6)

The robot apparatus according to any one of (1) to (5) described above, in which
the elastic body includes a coil spring or a torsion spring.

(7)

The robot apparatus according to any one of (2) to (5) described above, in which
the locking is achieved by a brake or a plunger, or fixation of the actuator itself (in a case where the actuator is an ultrasonic motor or a brushless motor).

(8)

The robot apparatus according to (5) described above, further including:
a plurality of legs, in which
each of the legs includes the load compensation section and the initial displacement amount setting section.

(9)

The robot apparatus according to (8) described above, in which
the initial displacement amount setting section of each of the legs sets an initial displacement amount corresponding to a toe force of each of the legs such that the robot apparatus is in a predetermined reference posture.

(10)

The robot apparatus according to (9) described above, in which
the robot apparatus includes a loading portion on which luggage is placed, and
the reference posture is a position and a posture of the robot apparatus in which the loading portion lies level.

(11)

The robot apparatus according to any one of (8) to (10) described above, in which,
in a case where toe forces of the legs vary according to the weight of the luggage placed on the robot apparatus and the weight of the robot apparatus main body and the position of the center of gravity, the initial displacement amount setting sections for the respective legs set different initial displacement amounts.

(12)

The robot apparatus according to (9) or (10) described above, in which
the initial displacement amount setting sections for the respective legs set different initial displacement amounts such that the robot apparatus is in a predetermined reference posture on a hill or in an irregular ground.

(13)

The robot apparatus according to any one of (8) to (12) described above, in which
the initial displacement amount setting sections set initial displacement amounts each time a change in the weight of the luggage placed on the robot apparatus and the weight of the robot apparatus main body or in the position of the center of gravity is detected.

(14)

The robot apparatus according to any one of (8) to (13) described above, in which
the initial displacement amount setting sections set initial displacement amounts each time the robot apparatus enters a hill or an irregular ground or a condition of a road surface is detected.

(15)

The robot apparatus according to any one of (8) to (14) described above, in which,
when at least one leg becomes unusable due to failure or malfunction, the initial displacement amount setting sections for the other legs set the initial displacement amounts.

(16)

The robot apparatus according to any one of (1) to (15) described above, in which
the elastic body includes a first elastic body and a second elastic body that are connected in series, and
the elastic body includes a structure imposing a preload between the first elastic body and the second elastic body.

(17)

The robot apparatus according to any one of (1) to (16) described above, further including:
a series elastic actuator driving the movable portion, in which
at least some of components of the load compensation section or the initial displacement amount setting section are common to the series elastic actuator.

(18)

A method for controlling a robot apparatus including one or more movable legs and utilizing an elastic body to compensate for a load acting on the movable leg, the method including the steps of:
calculating an initial displacement amount to be applied to the elastic body on the basis of a toe force of the leg calculated from a weight of luggage placed on the robot apparatus and a weight of the robot apparatus main body and a position of a center of gravity; and using an actuator to displace the elastic body by the initial displacement amount and locking the actuator with the elastic body remaining displaced by the initial displacement amount.

(19)

A load compensation apparatus for a robot apparatus including one or more movable portions, the load compensation apparatus including:
an elastic body compensating, by a restoring force, for a load acting on the movable portion; and
an initial displacement amount setting section applying, to the elastic body, an initial displacement amount corresponding to a desired position or posture of the movable portion.

(20)

The load compensation apparatus according to (19) described above, in which
the initial displacement setting section includes an actuator displacing the elastic body by an initial displacement amount and locks the actuator with the elastic body remaining displaced by the initial displacement amount.

REFERENCE SIGNS LIST

100: Robot apparatus
101: Loading portion
110: Movable leg
111, 112: Link
113, 114: Joint portion
120: Movable leg
121, 122: Link
123, 124: Joint portion
130: Movable leg
131, 132: Link
133, 134: Joint portion
140: Movable leg
141, 142: Link
143, 144: Joint portion
210: External sensor section
211L, 211R: Camera
212: Microphone
213: Touch sensor
221: Speaker
222: Display section
230: Control unit
231: Main control section
232: Battery
233: Internal sensor section
233A: Battery sensor
233B: Acceleration sensor
234: External memory
235: Communication section
401, 402, 403, 404: Spring for deadweight compensation
501: Luggage
600: Spring
800: Luggage
900: Luggage (heavy weight)
1000: Carrying (light weight)
1100: Load compensation mechanism
1101, 1102: Spring
1120: Initial displacement amount setting section
1300: series elastic actuator
1301: Actuator
1302: Load
1303: Elastic body
1501: Luggage

The invention claimed is:

1. A robot apparatus, comprising:
an actuator;
one or more movable portions, wherein
a movable portion of the one or more movable portions is a leg, and
the leg includes a joint portion having at least a degree of rotational freedom around a pitch axis;
an elastic body configured to:
generate a restoring force to compensate for a load applied on the movable portion; and
provide support to the joint portion; and
a control section configured to:
control the actuator to displace the elastic body by a first displacement amount, wherein the first displacement amount corresponds to one of a desired position of the movable portion or a desired posture of the movable portion;
control the actuator to lock the elastic body displaced by the first displacement amount;
set, based on a toe force of the leg, a second displacement amount; and
maintain the one of the desired position or the desired posture based on the generated restoring force, wherein the restoring force is generated based on the set second displacement amount.

2. The robot apparatus according to claim 1, wherein the control section is further configured to:
calculate the toe force of the leg based on a weight of luggage placed on the robot apparatus, a weight of a robot apparatus main body, and a position of a center of gravity of the robot apparatus; and
calculate the second displacement amount for the the elastic body based on the calculated toe force.

3. The robot apparatus according to claim 2, further comprising:
a plurality of legs; and
a plurality of sub-control sections, wherein
each sub-control section of the plurality of sub-control sections is configured to control a corresponding leg of the plurality of legs, and
each leg of the plurality of legs includes a respective elastic body and a respective actuator.

4. The robot apparatus according to claim 3, wherein
the each sub-control section is further configured to set a third displacement amount,
the third displacement amount corresponds to a specific toe force of each leg of the plurality of legs, and
the robot apparatus is in a specific reference posture based on the third displacement amount.

5. The robot apparatus according to claim 4, wherein
the robot apparatus further includes a loading portion on which the luggage is placed, and
the specific reference posture is a position of the robot apparatus and a posture of the robot apparatus in which the loading portion is at a level position.

6. The robot apparatus according to claim 4, wherein
the each sub-control section is further configured to set a fourth displacement amount for each leg of the plurality of legs, and
the robot apparatus is in a reference posture on a hill or in an irregular ground based on the set fourth displacement amount corresponding to each leg of the plurality of legs.

7. The robot apparatus according to claim 3, wherein, in a case where a respective toe force of a plurality of toe forces of the plurality of legs vary based on the weight of the luggage placed on the robot apparatus, the weight of the robot apparatus main body, and the position of the center of gravity, the each sub-control section is further configured to set a third displacement amount corresponding to each leg of the plurality of legs, wherein the third displacement amount is different for the each leg.

8. The robot apparatus according to claim 3, wherein
the each sub-control section is further configured to set a corresponding second displacement amount of a plurality of second displacement amounts for each leg of the plurality of legs, and
the corresponding second displacement amount is set based on at least one of detection of a change in the weight of the luggage placed on the robot apparatus, the weight of the robot apparatus main body, or the position of the center of gravity.

9. The robot apparatus according to claim 3, wherein the each sub-control section is further configured to set, based on detection of one of an entrance of the robot apparatus on a hill, an irregular ground, or a condition of a road surface, a corresponding second displacement of a plurality of second displacement amounts for each leg of the plurality of legs.

10. The robot apparatus according to claim 3, wherein, when at least one leg of the plurality of legs becomes unusable due to failure or malfunction, the each sub-control section, corresponding to each leg of the plurality of legs other than the at least one leg, is further configured to set a corresponding third displacement amount of a plurality of third initial displacement amounts.

11. The robot apparatus according to claim 1, wherein the elastic body includes one of a coil spring or a torsion spring.

12. The robot apparatus according to claim 1, wherein the actuator is locked by one of:
a brake or a plunger, or
the actuator in a case where the actuator is one of an ultrasonic motor or a brushless motor.

13. The robot apparatus according to claim 1, wherein the elastic body includes:
a first elastic body and a second elastic body connected in series, and
a structure configured to impose a preload between the first elastic body and the second elastic body.

14. The robot apparatus according to claim 1, further comprising
a series elastic actuator configured to drive the movable portion, wherein the series elastic actuator includes the actuator connectable to the load in series using the elastic body.

15. A method for controlling a robot apparatus, the method comprising:
calculating, by a control section of the robot apparatus, a toe force of a movable leg of one or more movable legs of the robot apparatus, wherein
the toe force is calculated based on a weight of a luggage placed on the robot apparatus, a weight of a robot apparatus main body, and a position of a center of gravity, and
the robot apparatus includes an elastic body to compensate for a load applied on the movable leg;
calculating, by the control section, an initial displacement amount for the elastic body based on the calculated toe force of the movable leg;
displacing, by an actuator of the robot apparatus, the elastic body by the initial displacement amount; and
locking, by the control section, the actuator with the elastic body that remains displaced by the initial displacement amount.

16. A load compensation apparatus, comprising:
an actuator;
an elastic body configured to generate a restoring force to compensate for a load applied on a movable portion of one or more movable portion of a robot apparatus; and
a control section configured to:
control the actuator to displace the elastic body by a first displacement amount, wherein the first displacement amount corresponds to one of a desired position of the movable portion or a desired posture of the movable portion;
control the actuator to lock the elastic body displaced by the first displacement amount;
set, based on a toe force of the movable portion, a second displacement amount; and
maintain the one of the desired position or the desired posture based on the generated restoring force, wherein the restoring force is generated based on the set second displacement amount.

* * * * *